US006985902B2

(12) United States Patent
Wise et al.

(10) Patent No.: US 6,985,902 B2
(45) Date of Patent: Jan. 10, 2006

(54) METHOD, SYSTEM AND APPARATUS FOR CREATING AND ACCESSING A HIERARCHICAL DATABASE IN A FORMAT OPTIMALLY SUITED TO REAL ESTATE LISTINGS

(75) Inventors: Mark Wise, Morgantown, WV (US); James B. Miller, Berkeley Springs, WV (US)

(73) Assignee: Threewide.com, Inc., Morgantown, WV (US)

( * ) Notice: Subject to any disclaimer, the term of this patent is extended or adjusted under 35 U.S.C. 154(b) by 445 days.

(21) Appl. No.: 10/067,959

(22) Filed: Feb. 5, 2002

(65) Prior Publication Data

US 2004/0098269 A1 May 20, 2004

Related U.S. Application Data

(60) Provisional application No. 60/290,834, filed on May 14, 2001, and provisional application No. 60/265,877, filed on Feb. 5, 2001.

(51) Int. Cl.
*G06F 17/30* (2006.01)

(52) U.S. Cl. ................................ 707/10; 707/1; 707/2; 707/3; 707/4; 707/5; 707/9; 707/10; 707/102; 707/104.1

(58) Field of Classification Search .................. 707/10, 707/9, 1–5, 102, 104.1; 345/418; 705/51, 705/36, 38
See application file for complete search history.

(56) References Cited

U.S. PATENT DOCUMENTS

| | | | | |
|---|---|---|---|---|
| 5,991,769 A | | 11/1999 | Fino et al. | |
| 6,108,619 A | | 8/2000 | Carter et al. | |
| 6,128,619 A | | 10/2000 | Fogarasi et al. | |
| 6,141,660 A | | 10/2000 | Bach et al. | |
| 6,195,652 B1 | | 2/2001 | Fish | |
| 6,223,190 B1 | | 4/2001 | Aihara et al. | |
| 6,633,875 B2 | * | 10/2003 | Brady | 707/10 |
| 2002/0109680 A1 | * | 8/2002 | Orbanes et al. | 345/418 |
| 2003/0229592 A1 | * | 12/2003 | Florance et al. | 705/51 |

* cited by examiner

*Primary Examiner*—Charles Rones
*Assistant Examiner*—Belix M. Ortiz
(74) *Attorney, Agent, or Firm*—DKW Law Group LLC

(57) ABSTRACT

A computer-implemented data management method, encryption system and interactive computer program for managing real estate information in a hierarchical database are disclosed. Also, a method, system and program for cross referencing a hierarchical database with a relational database are disclosed. A computer program accesses an XML definitional document on a handheld computer for inputting data related to real estate listings in a hierarchically controlled format for a database. Real estate agents provide input of data to the database using the handheld, portable computer. A menu or picklist driven display provides logical selection of data input and address fields, and a validation step for checking errors or omissions in the data entry procedure for a given record. A single, central database table is managed for input and distribution of real estate listing information to subscribers to the database management system.

36 Claims, 30 Drawing Sheets

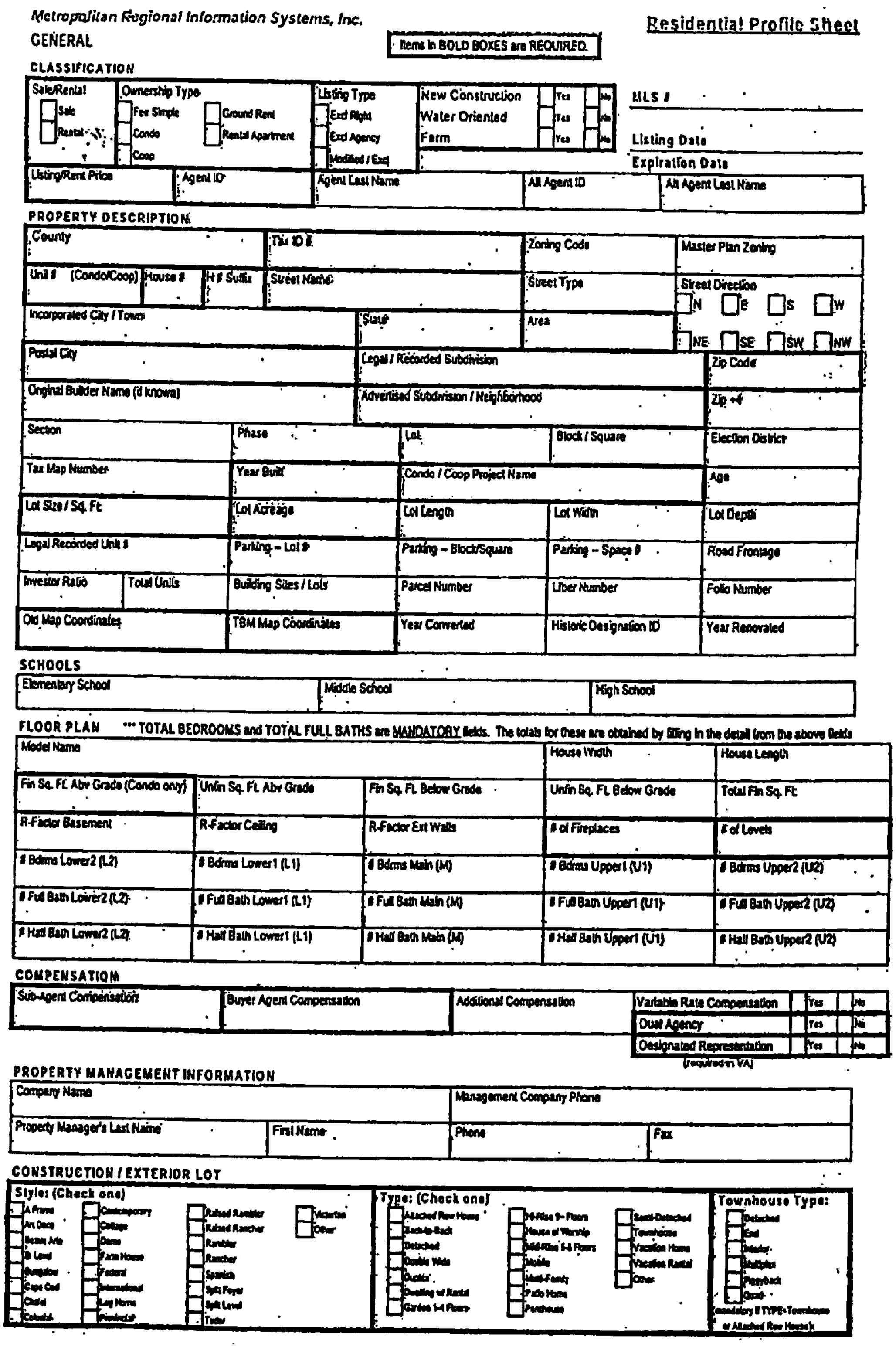

Metropolitan Regional Information Systems, Inc.

Residential Profile Sheet

GENERAL

Items in BOLD BOXES are REQUIRED.

CLASSIFICATION

| Sale/Rental | Ownership Type | Listing Type | New Construction / Water Oriented / Farm |
|---|---|---|---|
| Sale; Rental | Fee Simple; Condo; Coop; Ground Rent; Rental Apartment | Excl Right; Excl Agency; Modified / Excl | New Construction Yes No; Water Oriented Yes No; Farm Yes No |

MLS #

Listing Date

Expiration Date

| Listing/Rent Price | Agent ID | Agent Last Name | Alt Agent ID | Alt Agent Last Name |
|---|---|---|---|---|

PROPERTY DESCRIPTION

| | | | |
|---|---|---|---|
| County | Tax ID # | Zoning Code | Master Plan Zoning |
| Unit # (Condo/Coop); House #; H# Suffix | Street Name | Street Type | Street Direction: N E S W NE SE SW NW |
| Incorporated City / Town | State | Area | |
| Postal City | Legal / Recorded Subdivision | | Zip Code |
| Original Builder Name (if known) | Advertised Subdivision / Neighborhood | | Zip +4 |

| | | | | |
|---|---|---|---|---|
| Section | Phase | Lot | Block / Square | Election District |
| Tax Map Number | Year Built | Condo / Coop Project Name | | Age |
| Lot Size / Sq. Ft. | Lot Acreage | Lot Length | Lot Width | Lot Depth |
| Legal Recorded Unit # | Parking – Lot # | Parking – Block/Square | Parking – Space # | Road Frontage |
| Investor Ratio; Total Units | Building Sites / Lots | Parcel Number | Liber Number | Folio Number |
| Old Map Coordinates | TBM Map Coordinates | Year Converted | Historic Designation ID | Year Renovated |

SCHOOLS

| Elementary School | Middle School | High School |
|---|---|---|

FLOOR PLAN *** TOTAL BEDROOMS and TOTAL FULL BATHS are MANDATORY fields. The totals for these are obtained by filling in the detail from the above fields

| | | | | |
|---|---|---|---|---|
| Model Name | | | House Width | House Length |
| Fin Sq. Ft. Abv Grade (Condo only) | Unfin Sq. Ft. Abv Grade | Fin Sq. Ft. Below Grade | Unfin Sq. Ft. Below Grade | Total Fin Sq. Ft. |
| R-Factor Basement | R-Factor Ceiling | R-Factor Ext Walls | # of Fireplaces | # of Levels |
| # Bdrms Lower2 (L2) | # Bdrms Lower1 (L1) | # Bdrms Main (M) | # Bdrms Upper1 (U1) | # Bdrms Upper2 (U2) |
| # Full Bath Lower2 (L2) | # Full Bath Lower1 (L1) | # Full Bath Main (M) | # Full Bath Upper1 (U1) | # Full Bath Upper2 (U2) |
| # Half Bath Lower2 (L2) | # Half Bath Lower1 (L1) | # Half Bath Main (M) | # Half Bath Upper1 (U1) | # Half Bath Upper2 (U2) |

COMPENSATION

| Sub-Agent Compensation | Buyer Agent Compensation | Additional Compensation | Variable Rate Compensation Yes No; Dual Agency Yes No; Designated Representation Yes No (required in VA) |
|---|---|---|---|

PROPERTY MANAGEMENT INFORMATION

| | | | |
|---|---|---|---|
| Company Name | | Management Company Phone | |
| Property Manager's Last Name | First Name | Phone | Fax |

CONSTRUCTION / EXTERIOR LOT

Style: (Check one) A Frame; Art Deco; Beaux Arts; Bi Level; Bungalow; Cape Cod; Chalet; Colonial; Contemporary; Cottage; Dome; Farm House; Federal; International; Log Home; Pinwheel; Raised Rambler; Raised Rancher; Rambler; Rancher; Spanish; Split Foyer; Split Level; Tudor; Victorian; Other Type: (Check one) Attached Row Home; Back-to-Back; Detached; Double Wide; Duplex; Dwelling w/ Rental; Garden 1-4 Floors; Hi-Rise 9+ Floors; House of Worship; Mid-Rise 5-8 Floors; Mobile; Multi-Family; Patio Home; Penthouse; Semi-Detached; Townhouse; Vacation Home; Vacation Rental; Other Townhouse Type: Detached; End; Interior; Multiplex; Piggyback; Quad (mandatory if TYPE=Townhouse or Attached Row House)

FIG. 1A
(PRIOR ART)

*User's can find items from the list and return to the main menu via link in upper corner

*Digital Recording Tool*
Allows all recording items to be recorded with one device and stored under one database record.

Figure 6
Hierarchical organization and addressing of data

| | Address | Concept | Hierarchy |
|---|---|---|---|
| | 1.0 | Barn | |
| | 2.0 | Shed | |
| 12--- | 3.0 | House | House |
| | 3.1 | Porch | |
| | 3.2 | Room | House > Room |
| | 3.3 | Foundation | |
| 12a- | 3.2.1 | Kitchen | House > Room > Kitchen |
| | 3.2.2 | Master Bedroom | |
| | 3.2.3 | Living Room | |
| 12b- | 3.2.1.1 | Dimensions | House > Room > Kitchen > Appliances |
| | 3.2.1.2 | Appliances | |
| 12c- | 3.2.1.2.1 | Range-top | House > Room > Kitchen > Appliances > Range |
| | 3.2.1.2.2 | Refrigerator | |
| | 3.2.1.2.1.1 | Range - Gas40 | House > Room > Kitchen > Appliances > Range |

The above example shows one possibility for numerical addressing. Other possible means of addressing include any sequence of characters that have logical order. Some examples are:

2.4.5.7.1
24571
BKJRT
1, A, 5, T, 3

Possible organization of computer system using remote server

Note: for systems with local storage of the Database, the User Interface would interact directly with the database and the Server would not exist.

Possible organizations of ASP (Application Service Provider) systems

Figure 9

Search methods possible with hierarchical addressing

| Data Sample | Search Request | Methodology |
|---|---|---|
| 11 Main Residence<br>1112 Kitchen<br>1113 Living Room<br>111312 Fireplace | Find the number of rooms in residenc. | Read address field to count occurrences of four digit address beginning with "11" |
| A11 Main Residence<br>A1112 Kitchen<br>A1113 Living Room<br>B11 Main Residence<br>B1112 Kitchen<br>B12 Detached Garage<br>B1211 Workshop<br>B13 Gazebo | Find the number of properties with detached garage. | Group data by property ID (1st character of address), count occurrences of "12" in second two digits of address |
| 268.A Residence<br>268.AC Kitchen<br>268.AB Living Room<br>268.ACG Oven Gas<br>268.ACB Refrigerator<br>268.ACD Ice Maker In-door<br>268.ABA Fireplace<br>268.ABF Drapes | Find the type of oven in property 268. | Search for address "268.ACG", read contents of feature field |

Data sample tables:

| | |
|---|---|
| 11 | Main Residence |
| 1112 | Kitchen |
| 1113 | Living Room |
| 111312 | Fireplace |

| | |
|---|---|
| A11 | Main Residence |
| A1112 | Kitchen |
| A1113 | Living Room |
| B11 | Main Residence |
| B1112 | Kitchen |
| B12 | Detached Garage |
| B1211 | Workshop |
| B13 | Gazebo |

| | | |
|---|---|---|
| 268.A | Residence | |
| 268.AC | Kitchen | |
| 268.AB | Living Room | |
| 268.ACG | Oven | Gas |
| 268.ACB | Refrigerator | |
| 268.ACD | Ice Maker | In-door |
| 268.ABA | Fireplace | |
| 268.ABF | Drapes | |

Address

Assignation of addresses and record group (property) ID
Using example of realty industry

This figure uses alphabetical addressing. Numerical addressing or a combination of alphabetical and numerical can also be used. The group ID may also be stored in a field separate from the address. See Figure 5 for samples of numerical addressing with separate group ID.

METHOD, SYSTEM AND APPARATUS FOR CREATING AND ACCESSING A HIERARCHICAL DATABASE IN A FORMAT OPTIMALLY SUITED TO REAL ESTATE LISTINGS

CROSS-REFERENCE TO RELATED APPLICATIONS

The Applicants claim the benefit of the earlier filing dates of U.S. Provisional Patent Application Ser. No. 60/265,877 filed Feb. 5, 2001 and U.S. Provisional Patent Application Ser. No. 60/290,834 filed May 14, 2001.

COPYRIGHT NOTICE

A portion of the disclosure of this patent document contains material which is subject to copyright protection. The copyright owner, Threewide.com, Inc., has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION (1) Field of the Invention

This invention relates to a computer implemented data management method, a computer system and an interactive computer program for creating, storing and relating a hierarchical database. The present invention may be realized, in a preferred embodiment, as a real property listing management system. In another preferred embodiment, the invention is realized as a data management system provided by an application service provider (ASP) over a network such as the Internet or another communications channel for use with a local or distributed computer system and, more particularly, to a hierarchical database adapted for entry and storage of retrievable and reusable information related to real estate listings.

(2) Description of Related Art—Background Information Databases

The need to represent real-world systems in computer usable form has led to the existence of databases for storing, retrieving and manipulating data. Applications programs may include internal logic to handle such tasks, but a more useful approach is to provide a set of computer programs that facilitates the creation, management, and manipulation of databases. Such a set of computer programs for managing one or more databases is a database management system. Using a database management system, an applications programmer may write an applications program without detailed, intimate knowledge of how or where the data is stored or retrieved. Thus, database management systems provide a measure of independence between the data of a database and the applications programs. This advantage may be referred to as data independence.

Data independence is desirable. Without data independence, a change in the structure of underlying data necessitates a corresponding change in the applications programs that rely on such a structure. The data independence provided by database management systems serves to avoid applications program modification.

In an environment having a database management system, applications programs communicate with an automated database manager. The database manager may be referred to as a database server. In particular, the applications programs may send messages to the database server in a predefined format. Such formatted messages may be referred to as database calls. A database call invokes one or more corresponding functions of the database management system, usually with respect to a particular database. A database management system provides applications programs with a variety of callable functions.

Every database management system is based on a general database model. A database management system based on the relational model may be referred to as a Relational Database Management System (RDBMS). An RDBMS is a system of computer programs that facilitates the creation, management, and manipulation of relational databases.

Relational Database Management Systems

Every relational database is based on the relational model. The relational model is familiar to one of skill in the art. According to the relational model, data is perceived to exist as a collection of relational tables. An example of an RDBMS is DB2, which commercially is available through International Business Machines Corporation.

A relational table expresses a relation between things. Relational tables are characterized by rows and columns. Although the rows and columns of relational tables may be employed in many ways, the relational model provides that vertical columns pertain to entities or attributes of entities and that horizontal rows, pertain to specific instances of entities or specific instances of attributes of an entity. A column may therefore be thought of a representing a field, and a row may be thought of as representing a record. The rows and columns of a relational tables intersect to define data cells.

The function calls that an applications program may make to the database server have a somewhat standardized structure that is tailored to the relational model. This structure for RDBMS function calls is generally referred to as the Structured Query Language (SQL).

Tables in a relational database are related to each other by key fields that must be duplicated between tables. In this way, a single piece of data can have another entire table of data associated with it. For example, a hotel entry may have another table related to it that contains data on rooms available at that hotel. The database would link the two tables by having one field in common between them. This often takes the form of an ID number that would occur in each table. This ID number would be known as the key or primary key depending on whether duplicates are allowed. No duplicates are allowed in a primary key thus eliminating the possibility of a many-to-many relationship. A record in one table (commonly known as the parent table) with a key or primary key field that contained the numeral "24" would be represented in another table (commonly known as the child table) by one or several records all of which contained the key or primary key "24." Parent-to-child table relationships can be one-to-one, one-to-many, or many-to-many.

These relational tables allow hierarchical data to be stored by creating a table for each level of the hierarchy and separate groups of tables for each branch of the hierarchy. Complex sets of data with multiple relationships and many levels of hierarchy can require hundreds or thousands of tables to store all of the data. As the number of tables grows, disk storage space is quickly consumed and data retrieval speeds slow. The computer system, which may use various programming languages to search the database, will be required to follow all of these keys or primary keys between tables in order to find the relationships it is searching.

No matter the length of the table, it is always faster to search within only one table rather than between several because searching within several tables requires the computer system to open and manage multiple files. This results in both RAM and ROM consumption.

Furthermore, a set of tables in a relational database is inflexible. While records can easily be manipulated through add, replace, update or delete operations, the database structure itself is hard to modify. To capture new types of information in the database, it is necessary to modify the database to include a new table or to modify a table already in the database to include a new column. The applications programs that interact with the database also need to be modified to take into account the newly introduced type of information.

The independence between applications programs and the data in a relational database management system is thus less than complete independence. The applications programs and the database structure still need to be modified whenever new kinds of data are introduced. The relational approach is thus too brittle to keep up with situations in which data fields are likely to be added, or in which the requirement to store new and unexpected kinds of data frequently occur.

The standard formatting of a relational database, in which tables are separated and related through key fields, uses a much larger amount of space on the computer and requires much more time to manage the data. Searching for a single data item over multiple tables is much slower than searching for the same item in a single table.

The Real Estate Industry

The real estate industry utilizes property listing information. Accuracy of information contained in a property listing is essential to the ability of a real estate professional to market a property, make the sale and manage the sales transaction. The process of handwriting and then manually transferring or recording the data is inefficient and time-consuming and often leads to missing, insufficient and inaccurate property information.

Currently, a realtor records new property listing information at the property site using pre-printed paper forms and a pencil. Once this manual process is completed, the realtor must return to the office and reenter all the information into a Multi List Service (MLS) database. By "Multi List Service", what is meant is an organization that compiles, publishes and distributes information to subscribing realtors and real estate agencies. An example of such prior art data-gathering form is illustrated in FIG. 1A and FIG. 1B. Systems such as the MLS, which realtors currently use to record property data, avoid this problem presented by the standard formatting of a relational database by limiting the amount of data they store and the searchability of the database. However, the MLS also does not offer the realtor the flexibility to record unusual or unique attributes of a property because the number of available fields per property is very limited. It can be readily observed by referring to the prior art data sheets set forth in FIGS. 1A and 1B, that an exhaustive list of possible attributes may be associated with a particular property listing. A realtor, for example, would have no place except in a text comments field in the MLS to record whether a property had an RV storage building. Moreover, the many related attributes of the MLS listing are difficult if not impossible to present in an orderly, cohesive and, more importantly, searchable format. The example sheet shown is part of a form copyrighted by the Metropolitan Regional Information Systems, Inc. and is offered for illustration purposes only.

The method of the prior art increases time and cost associated with listing a property. There is no methodical way of automatically verifying to ensure that required legal information (such as, for example, tax parcel, recorder's office information, owners name or financing options) is included. Existing methods also increase the possibility of transcription oversight and erroneous data entries and other human error factors. These error sources present a host of problems when marketing a property, trying to make the sale, and finally managing the sale transaction.

SUMMARY OF THE INVENTION

What is disclosed as one embodiment of this invention is computer-implemented data management method, a computer system and an interactive computer program product that guides a real estate agent through a systematic method for digitally gathering, recording and sending property listing information to the MLS or other compatible database. The program can be run on a handheld computer, or other similar compact-sized computer, also referred to as a Personal Digital Assistant (PDA), using the Palm Operating System (Palm-OS) or any similar operating system for use in a PDA. In this way, the agent may record property listing information in digital format while walking through a property. The recorded information may then be transferred electronically, or "uploaded" directly to an MLS database.

It should also be noted that although the PDA is used in the preferred embodiment, that other computers, such as portable laptop or notebook computers and desktop computers, may be adapted to run the same application.

The real estate industry has no such standard list or procedure for listing the characteristics and features of real estate. This can cause confusion and missed information, which slows down the recording process. The present invention provides a solution to the above-described problems of the prior art with existing methods of gathering, recording, tracking and storing accurate information.

In one embodiment of the present invention, a hierarchical real estate data recording and storage system and method are provided. The hierarchical format employs the Property, Structure, Room™ (P.S.R.) system for structuring a highest to lowest hierarchy, wherein Property attributes signify the broadest, most general and highest order attributes of the database. Structure attributes are subcategories that are contained within the Property record, signifying a secondary level attribute. Room attributes are subcategories contained within a structure record, signifying a third level attribute. The P.S.R. system is a new approach to gathering property information that is disclosed, which captures all required data in a manner which is better, faster and with fewer user errors.

In one embodiment of the invention, extensible Markup Language (XML) is the programming language for describing and implementing the database input and output attributes. The invention in the embodiments described below may communicate electronically with any XML-compliant organization within the industry.

Another embodiment of the present invention is programmed using the programming language Cold Fusion®, from Allaire Corporation, to create a web-based user interface that is browser independent. The database provided in the present invention may be accessed via web browsers such as Microsoft Corporation's Internet Explorer® or Netscape's Navigator® via the world wide web. The database provided in the present invention may be accessed by the Cold Fusion program through an SQL Server 2000 database via Microsoft's ODBC connections. Open Database Connectivity (ODBC) is a widely accepted application programming interface for database access. ODBC uses Structured Query Language (SQL) as its database access language.

The software guides the agent through the recording process with validation capabilities when finished. Once the recording process is completed, the data will be uploaded digitally to the MLS, eliminating the need to reenter data.

The invention is applicable in the real estate property field, and also has applications in a wide variety of fields, such as the automotive industry, the travel industry or any data gathering endeavor in which data can be ordered in a hierarchical manner.

The invention is realized in a computer-implemented data management method for managing information relating to entities, and also a computer system and a computer program product for the same. The method is characterized in that there is provided, on a computer system, a table for records, each with an address field and a descriptor. According to the method, the entry of new records in the table is controlled so that the address fields for all of the records, when taken together, define a semantic hierarchy among the records in the table.

More particularly, the method may be performed so that the address field has a hierarchically ordered set of identifiers or values that may be separated by separators such as periods. For each of the data entries, the records are controlled to provide a table with a highest level record, which is most general or broadest record, and a plurality of semantically lower records, which relate to the next higher level record but are more specific or narrow in scope. In particular, for each given record other than the highest level ones, the semantic meaning of the descriptor is based on a set of records in the table semantically above it. Moreover, a particular record is considered to be a member of the set of records semantically above it when all of the identifiers of the particular record appear identically in the same positions in the address field of the given record, but the given record has at least one identifier not appearing identically in the same position in the address field of the particular record.

In more particular embodiments, the records may include feature information, and there is a user interface provided to ensure the properly controlled entry of the new records. The preferred user interface has selection, navigation and designation elements, as well as a hierarchical orientation element. The selection element is responsive to user inputs to select one of a plurality of predetermined selectable values. The navigation element is responsive to user inputs to manipulate the selection element to display one of the plurality of predetermined selectable values and to indicate a selection of one of the predetermined selectable values. The designation element is responsive to user inputs to store in the table a new record having the descriptor based on the selection of the one of the predetermined selectable values.

Preferably, all of the records are in the same table, and only one table is used. Having only a single table allows for quick and flexible lookup without the need for joins or links among different tables. In certain arrangements, however, the collection of information occurs remotely using mobile devices. Then, the records are created in a sub-table that is added to a centrally managed table when circumstances permit.

It is an object of the present invention to overcome the above-identified deficiencies of current database management systems by providing a hierarchically addressed, flexible, expandable, adaptable data management system.

It is an object of the present invention to replace the pen and paper method of recording property listing information.

It is another object of the present invention to provide a system and a method to enable an individual, such as a real estate agent, to digitally record property listing information using a PDA, and then to upload it to an MLS database.

Yet another object of the present invention is to provide a method and a system that decreases recording time and increases data accuracy and completeness.

A further object of the present invention is to provide a novel method of describing property listing information.

Another object of the present invention is to provide a hierarchical logical progression and set of instructions to enable an individual such as a real estate agent or salesperson to record property data sequentially beginning with the property as a unit, then to the associated structure or structures within the property, and then to the rooms associated within the structures.

Yet another object of the present invention is to provide a system and method of describing real estate that employs a plurality of categories classified according to criteria in successive levels.

One more object of the present invention is to provide a picklist system to facilitate data entry and ensure data integrity.

Since no two properties are alike, an agent can customize the information gathered by adding new fields on the fly. Fields for required legal documents such as deeds, plats, covenants, restrictions, flood plain certifications and disclosures are also available. Built-in controls ensure that all required information has been recorded.

BRIEF DESCRIPTION OF THE DRAWINGS

FIGS. 1A and 1B are examples of prior art;

FIG. 6 is an illustration of one embodiment of the hierarchical organization and addressing of data, in this case in the real estate industry;

FIG. 9 is an illustration of a possible organization of the Application Service Provider System of the present invention.

DETAILED DESCRIPTION OF THE INVENTION

Generalization of the Invention

Figure 1B:
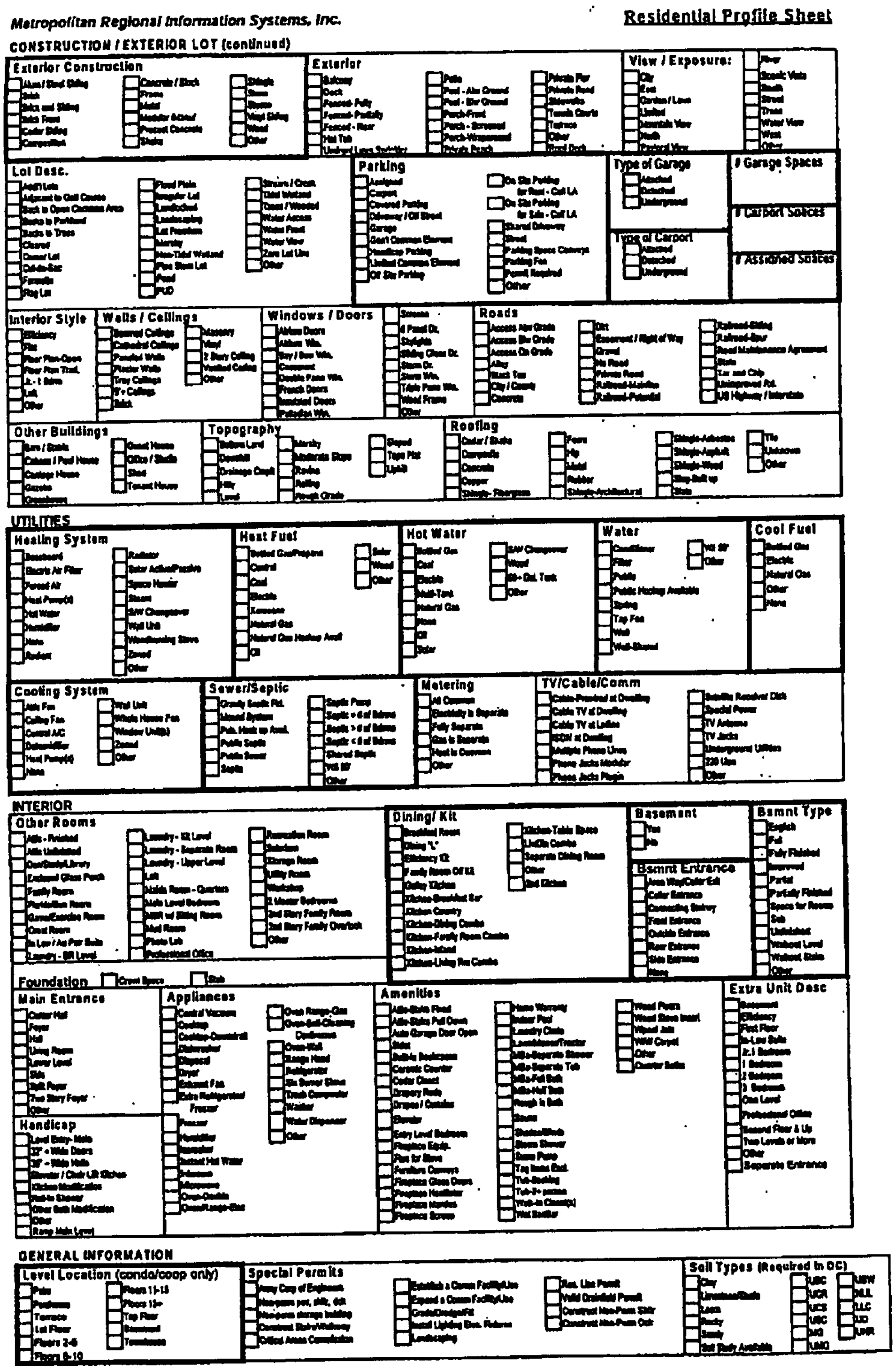

One embodiment of this invention resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

The invention may be embodied in a computer program product, as will now be explained. On a practical level, the software that enables the computer system to perform the operations described further below in detail may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media," or "computer-readable media," as used here, may include a diskette, a tape, a compact disc, an integrated circuit, a ROM, a CD, a cartridge, a memory stick, a remote transmission via a communications circuit or any other similar medium usable by computers now or hereafter known. For example, to supply software for enabling a computer system to operate in accordance with the invention, the supplier might provide a diskette or might transmit the software in some form via satellite transmission, via a direct telephone link or via the Internet. "Internet" refers to a large system of networked computers that enables a wide variety of interaction between computers worldwide.

Thus, the term "computer readable medium" is intended to include all of the foregoing and any other medium by which software may be provided to a computer.

Although the enabling software might be "written on" a diskette, "stored in" an integrated circuit or "carried over" a communications circuit, it will be appreciated that, for the purposes of this application, the software will be referred to as being "on" the computer readable medium. Thus, the term "on" is intended to encompass the above and all equivalent ways in which software is associated with a computer usable medium.

For the sake of simplicity, therefore, the term "computer program product" is thus used to refer to a computer readable medium, as defined above, which has on it any form of software to enable a computer system to operate according to certain pre-defined steps.

Thus, the invention is also embodied in a computer program product having software on a computer readable medium.

A user interface may be understood to mean any hardware, software or combination of hardware and software that allows a user to interact with a computer system. For the purposes of this discussion, a user interface will be understood to include one or more user interface objects. User interface objects may include display regions, user activatable regions and the like.

A user interface may be invoked by an application program. When an application program invokes a user interface, it is typically for the purpose of interacting with a user. It is not necessary, however, for the purposes of this invention, that an actual user ever interact with the user interface. It is also not necessary, for the purposes of this invention, that the interaction with the user interface be performed by an actual user. That is to say, it is foreseen that the user interface may have interaction with another program, such as a program created using macro programming language statements that simulate the actions of a user with respect to the user interface.

Using the above-identified figures, the invention will now be described with respect to various preferred embodiments. Although many specificities will be mentioned, it must be emphasized that the scope of the invention is not to be taken to be that of only the preferred embodiments, but should be construed in accordance with the claims appended below.

Figure 2:
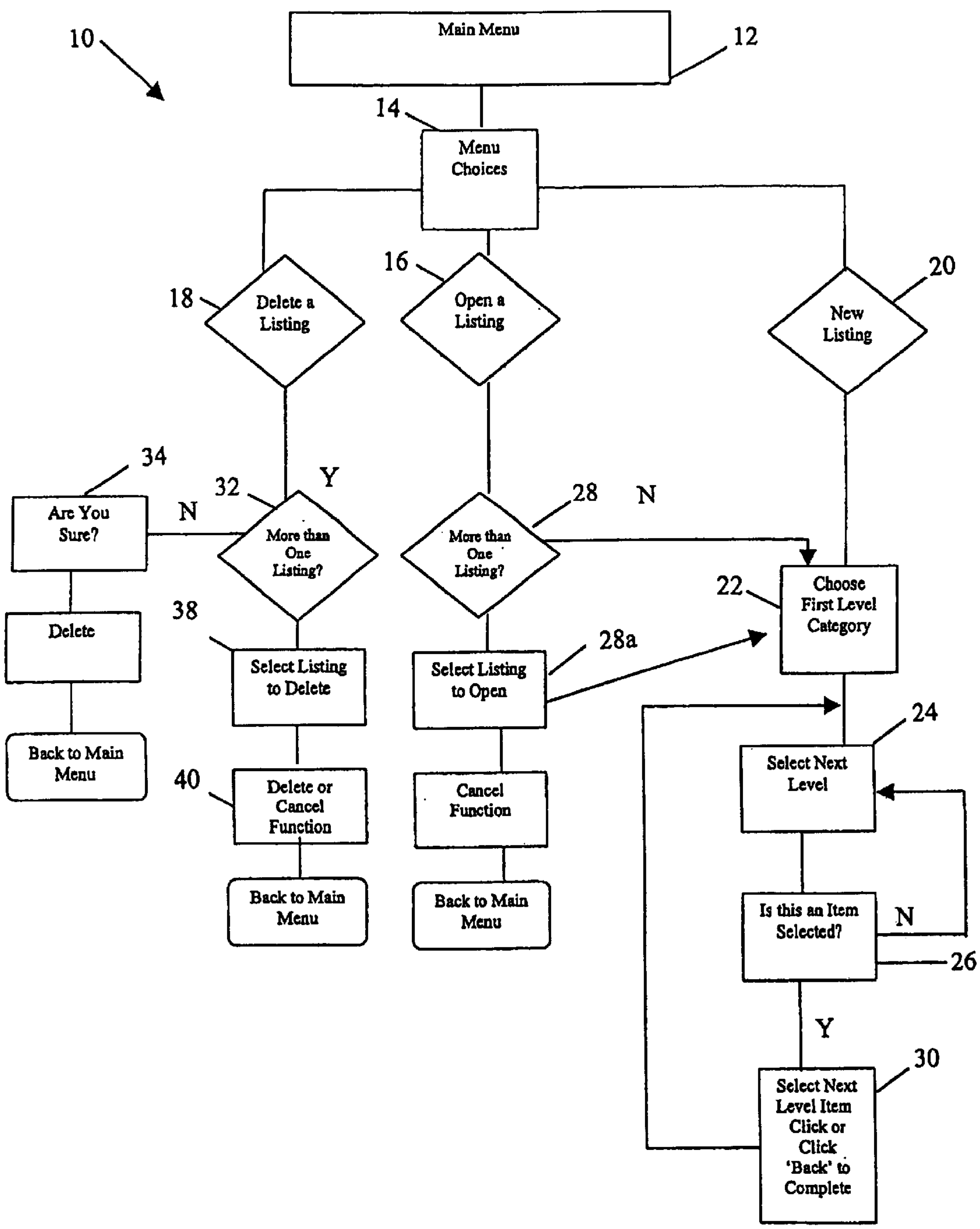
FIG. 2 is a flow diagram illustrating the general sequence of a user interface methodology.

Referring to FIG. 2, a flow diagram 10 is shown, illustrating the general sequence of user interface methodology which can be resorted to in developing a software program to implement one preferred embodiment of the hierarchically addressed database in a real estate application. At a main menu 12, menu choices 14 are displayed. If the user indicates (by a stylus associated with the handheld computer or mouse or other associated input device) that the user wishes to enter the new listing 20, the first level categories 22 are then displayed. The user then has the option of being prompted through a succession of hierarchically arranged data categories. The user selects from the first level categories 22, and the second level categories 24 are displayed; from that display, the user has an option to select an item 26. If an item is selected from the second level categories 24, third level categories 30 are displayed as another set of selections. The user selects from the third level categories 30 and enters items to associate with the second level category, and repeats the selection process as often as the user wants until complete. When complete, the user indicates "back," using a pointer, mouse or other associated input device. The display returns to the second level category display 24. It should be noted (indicated by * on FIG. 2) that the user may return to the main menu 12 at any point via a link displayed in one corner of the display field.

Returning to the main choices 14, if the user selects open listing 16, the system check to determine if there is more than one listing record available 28. If not, the first level categories 22 are displayed. If more than one listing record is available, the user is prompted to select a listing **28*a* from a list of all available listings. For example, if a handheld unit is running the application, the number of listings available for opening or deletion would be limited to the listings stored therein, or alternatively, if connected by wireless modem, for example, a directory of the host computer database may be available for opening or deletion. After a listing is selected, the first level categories 22** are displayed again. Any existing data associated with the listing already in the database can be supplemented or modified at that point. The steps of a new listing are repeated as set forth in the preceding paragraph.

Returning again to flue main choices 14, the third option the user may select is delete listing 18. If delete listing 18 is selected, the system checks to determine if more than one listing is available 32. If no, a confirmation step 34 is interposed to avoid accidental deletions. After deleting the files the program then returns to the main menu 12. If more than one listing record is available, the user is prompted to select a listing 38 from a list. The user then must select to either delete the listing or cancel the function 40, and then the program returns to the main menu 12.

In a preferred embodiment, the hierarchical arrangement of the data categories is effectuated by the use of the Property, Structure, Room™ (P.S.R.) concept. Property, Structure, Room™ (P.S.R.) is a trademark of Threewide.com, Inc., for a novel and useful method of electronically describing and organizing property listing information according to various criteria into successive levels. The hierarchical format employed by P.S.R. structures from a highest to lowest hierarchy. Property attributes signify the broadest, most general and highest order attributes of the database. Structure attributes are subcategories that are optionally contained within the Property record, signifying a secondary level attribute. Room attributes are subcategories. When integrated with a digital software environment, the P.S.R. method can guide the user dynamically through every recording process while efficiently storing and classifying every piece of listing data. This data can then be easily converted and prepared for electronic distribution to an endless array of information recipients.

The table below illustrates the ordered and hierarchical approach of the P.S.R. method for gathering and recording property listing information:

made them very useful and popular substitutes for date books, note pads, calendar applications and, as set forth in this disclosure, data entry applications.

A display 212 depicts the main menu with selection icons disposed thereon. An open listing button 216 represents the field for selection of a listing which exists in the database. A button 220 is a selection option to create a new listing; and a button 218 indicates a button to select delete listing. The user makes selections using a pointed stylus (not shown) which, when applied to the surface of a touch screen 222 within the field of buttons 216, 218 and 220, and PDA specific buttons, generally designated as 226, selects the associated operation. Alternatively, control buttons 224 across the bottom front panel of PDA 210 also permit the user to navigate through and select various options. Navigation buttons 228*a*, 228*b* permit navigation up and down through a scrolling screen for use in selection of menu driven options on screen 212.

Figure 2A:
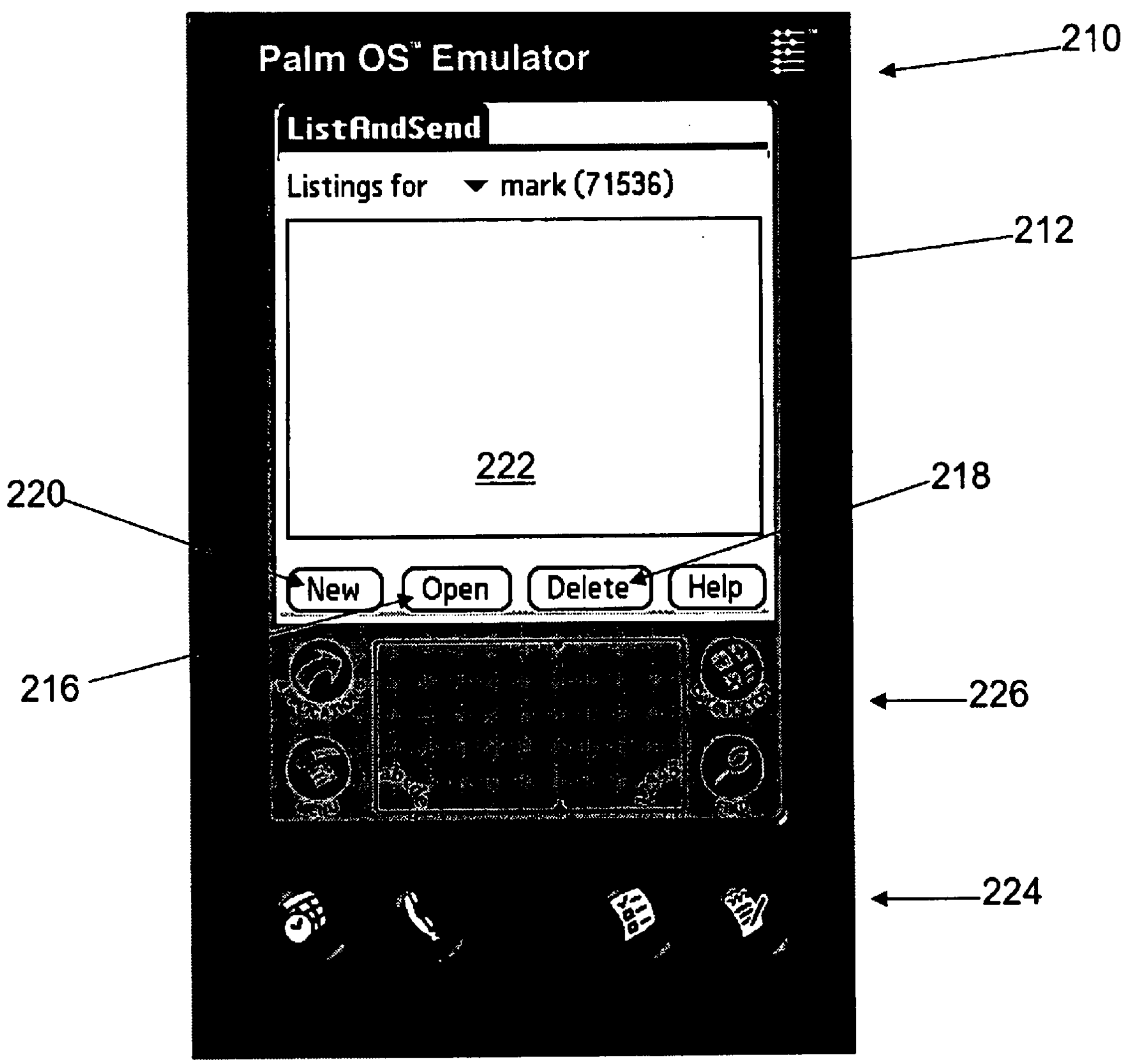
FIGS. 2A–2F illustrate a series of user interface screens of a handheld computer running an embodiment of the present invention.
Figure 2B:
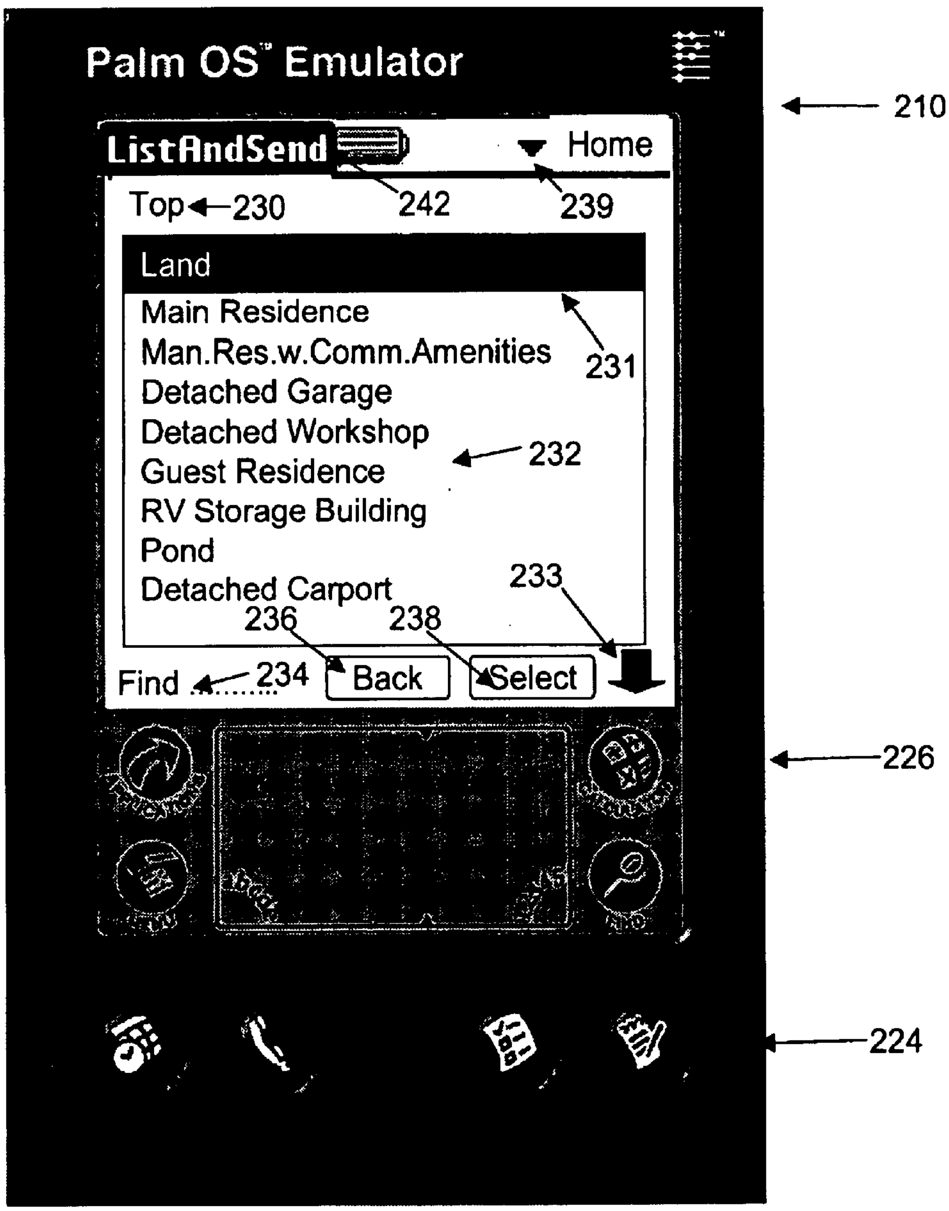

Referring next to FIG. 2B, the handheld PDA 210 in this embodiment illustrates a first or top level 230 screen on which is displayed a picklist 232, in this instance highlighting a "pick" option 231 "Land." A picklist scrollbar 233 appears at the right side of the picklist 232 field. When the picklist 232 exceeds the viewing area allocated on the screen of the handheld PDA 210, the scrollbar appears. By touching the stylus on the down arrow or using up and down controls 228*a*, 228*b*, the additional selections may be accessed using the scrollbar 233.

| HIGHEST LEVEL ATTRIBUTE | SECOND LEVEL ATTRIBUTE | THIRD LEVEL ATTRIBUTE |
|---|---|---|
| Property: When beginning the recording process, the first pieces of information have to do with the property. These are all considered top items in the hierarchy, e.g. seller and legal information, directions, etc. When a top-level category other than structures is chosen, such as any legal information, deeds, plats, etc., the system will ask for information that is pertinent only to that category and stop. However, when a structure is chosen, the user is guided to the next level of information that is called structures. | Structure: The next level of the recording process identifies all the structures on the property. A structure is anything that is fixed to the property, e.g. House, Garage, Pond, etc. After the structures are identified, the system leads the user through the recording of the external features of each structure, e.g. dimensions, foundation types, siding, etc. Then, as the Agent moves into each structure, the rooms are recorded. | Room: This level of the recording process identifies the rooms within a structure. A room is any part of the inside of the structure, e.g. Foyer, Porch, Living Room, Kitchen, Hall Way, etc. As the rooms are chosen the Agent records the features and specifications that pertain to that room within the structure. |

The Palm Pilot Application

Referring next to FIG. 2A, in another preferred embodiment, a handheld computer is generally designated as 210. By handheld computer or "PDA," what is meant is a miniature to smallish computer ranging from the size of a standard credit card to an average palm size or pocket size digital tablet with a stylus and a rectangular display screen which was pioneered by Palm, Inc. A variety of similar models using the Palm Operating System or a scaled down version of MS Windows is suitable to the present invention as well. Thus, the PDA may refer to a pocket size personal computer of which more than a dozen are presently available in the United States. The typical system runs applications using up to 32 megabytes (MB) of RAM, although evolving memory of greater capacity is expected in which broader and denser data may be placed. The compact size coupled with the versatility of the applications that may be run have A "Find" feature 234 permits the entry of alphanumeric characters in order to navigate within the picklist as well. Additionally, buttons 236, 238 provide "Back" 236 and "Select" 238 options when touched. At the top right corner of the display 212, a "Home" option 239 is accessible to escape from the top level field and return to the main menu. Additionally, a banner 242 is viewable at the top left portion of the PDA screen 212. Banner 242 may optionally include an advertising or trademark display.

In this picklist 232 the top level menu selections relate to hierarchically the highest semantic level, logically of a real estate listing. Options that may logically be selected from the list of selections as follows:

Land;

Main residence;

Main residence with common amenities;

Detached garage;

Detached workshop;

Guest residence;

RV storage building;

Pond; and

Detached carport.

Additional selections are accessible by operating the scrollbar 233. It should be noted that in a preferred embodiment, the list of selections is in order of probability, with the most probable feature the top selection and the least probable selection at the bottom. Probabilities are determined by statistical experience and may be updated and refined periodically as changes occur.

It should also be noted that the lists shown in FIGS. 2B–2F are not shown in their entirety, but limited to the available screen space. The selection list may include a large number of selections that are viewable in their entirety by using the scrollbar feature.

Figure 2C:
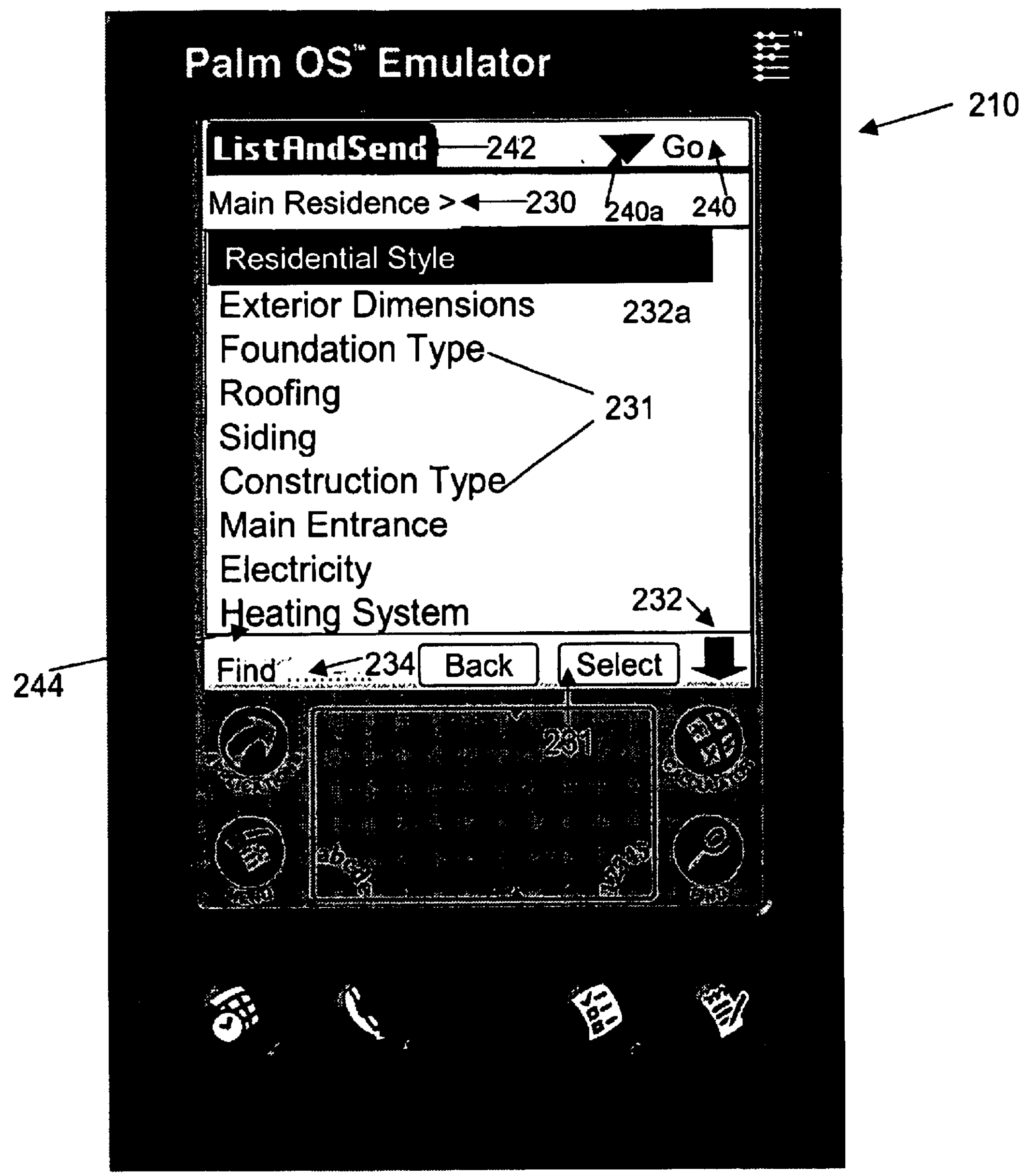

Referring next to FIG. 2C, the second level selection is illustrated in this embodiment. Banner display 242 is modifiable as contrasted with the banner display in FIG. 2B in the upper left corner of the display. At the upper right, a "Go" command 240 may be exercised by selecting arrow **240*a* which presents a drop down menu selection list (not shown). The Level Indication 230 in this instance is a main residence, which represents a subcategory of the land indicated in the top level 230. A picklist 232*a* for the main residence category is shown in FIG. 2C. This shows a partial display of the associated picklist. The appearance of the scrollbar 233 at the bottom right of the picklist display 232*b* indicates that additional options are viewable upon operation of the scrolling function. A listing of subcategories 244 for a main residence category is partially illustrated. Back button 236** when selected by the user will select the next highest level screen, in this case the top level. A find field is also provided for alphanumeric searching.

The picklist options 231 in this screen illustration relate to the Main Residence which was selected from the previous, top level screen of FIG. 2B. Options that may logically be selected from the displayed list of picklist options 231 as follows:

Residential style;

Exterior dimensions;

Foundation type;

Roofing;

Siding;

Construction type;

Main entrance;

Electricity; and

Heating system.

Additional selections are viewable by scrolling. Similarly to FIG. 2B, selections appear in order of relative importance, with the most important feature appearing at the top. Selections are ranked statistically and logically.

Figure 2D:
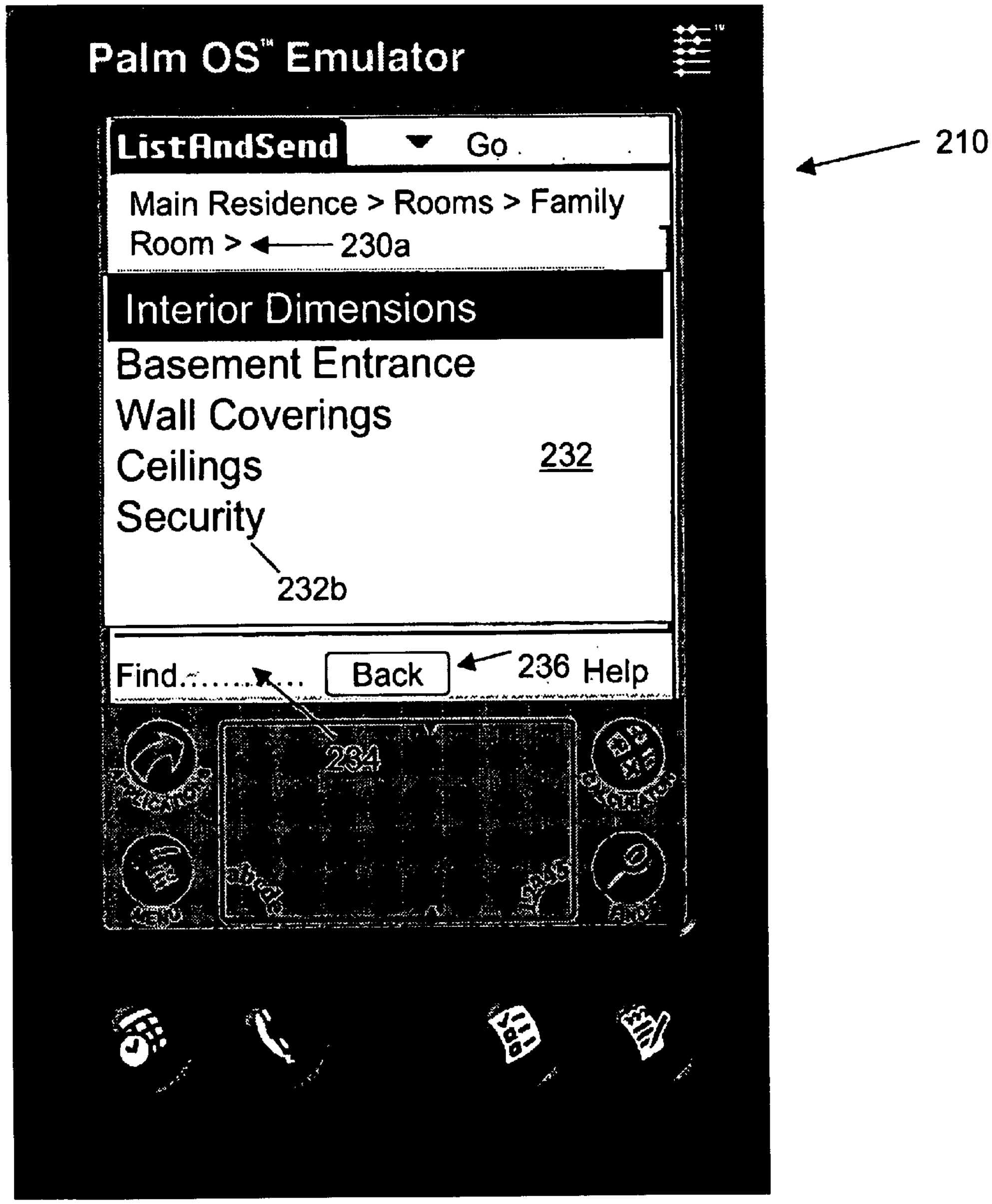

Referring next to FIG. 2D, the handheld PDA in this embodiment is showing the third level screen in which hierarchical orientation element or level indicator is the "Main Residence>Rooms>Family Room" **230*a* as the level indicator. Picklist display 232*b* associated with the family room attributes is illustrated in the picklist field box. In the FIG. 2D illustration, the option "Interior Dimensions" is highlighted for selection. Back button option 236 also facilitates navigation to the previous or higher level. Find feature 234** is also available for alphanumeric searching.

The picklist displays **232*b* in this screen illustration relate to a third highest level selection, the Family Room, selected from the second highest level selection, Rooms, of the Main Residence Top Level Options displayed are Interior Dimensions, Basement Entrance, Wall Coverings, Ceilings, and Security. No scrollbar arrow appears in the bottom left, as the picklist does not exceed the available screen space 232**.

Figure 2E:
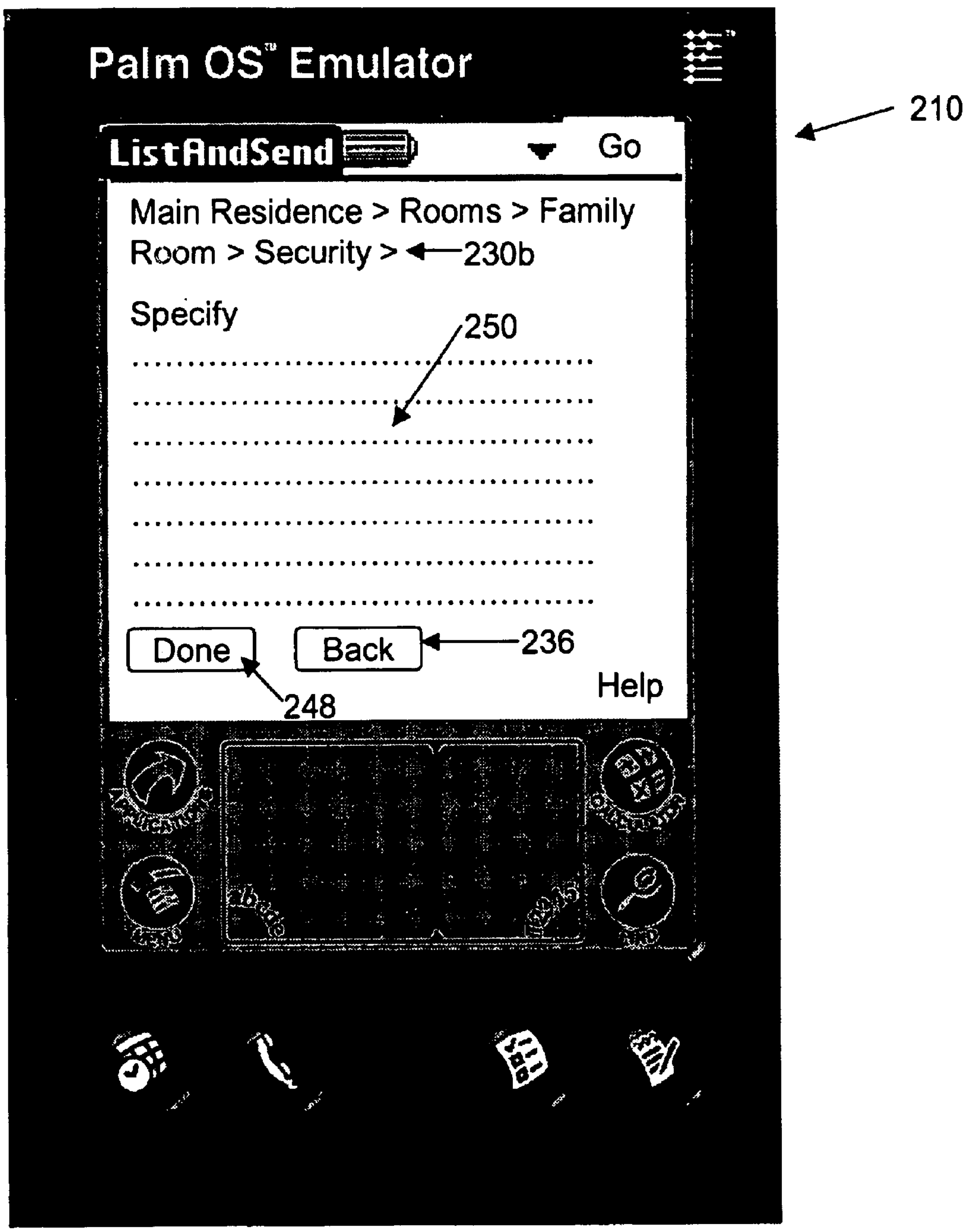

Referring to FIG. 2E, a fourth level indication **230*b* shows the level sequence of "Main Residence>Rooms>Family Room>Security". A data entry screen 250 is provided under the word "Specify" indicating a field for entry of text on the screen. Descriptions—in this instance, security system specifics—may be entered in alphanumeric characters under the specify portion of the picklist field of the data entry screen 250. This level of screen differs in principle with the previous screens, as the information is entered rather than selected from a picklist in this case. Data entered into this specified screen is stored as text in a field addressed under "Main Residence>Room>Family Room>Security". Data entry screens are not restricted to lowest level screens, and may appear at any level in the hierarchy, if applicable. A help field 246 is provided indicating that a help function is accessible by touching the screen at that point to launch a help application in which information may be accessed relevant to the particular screen. In this instance a done button 248 when selected will return the user to the second level screen for further input or escape to the main menu. Back button 236** provides the user the option of returning the program to the next previous level.

Figure 2F:
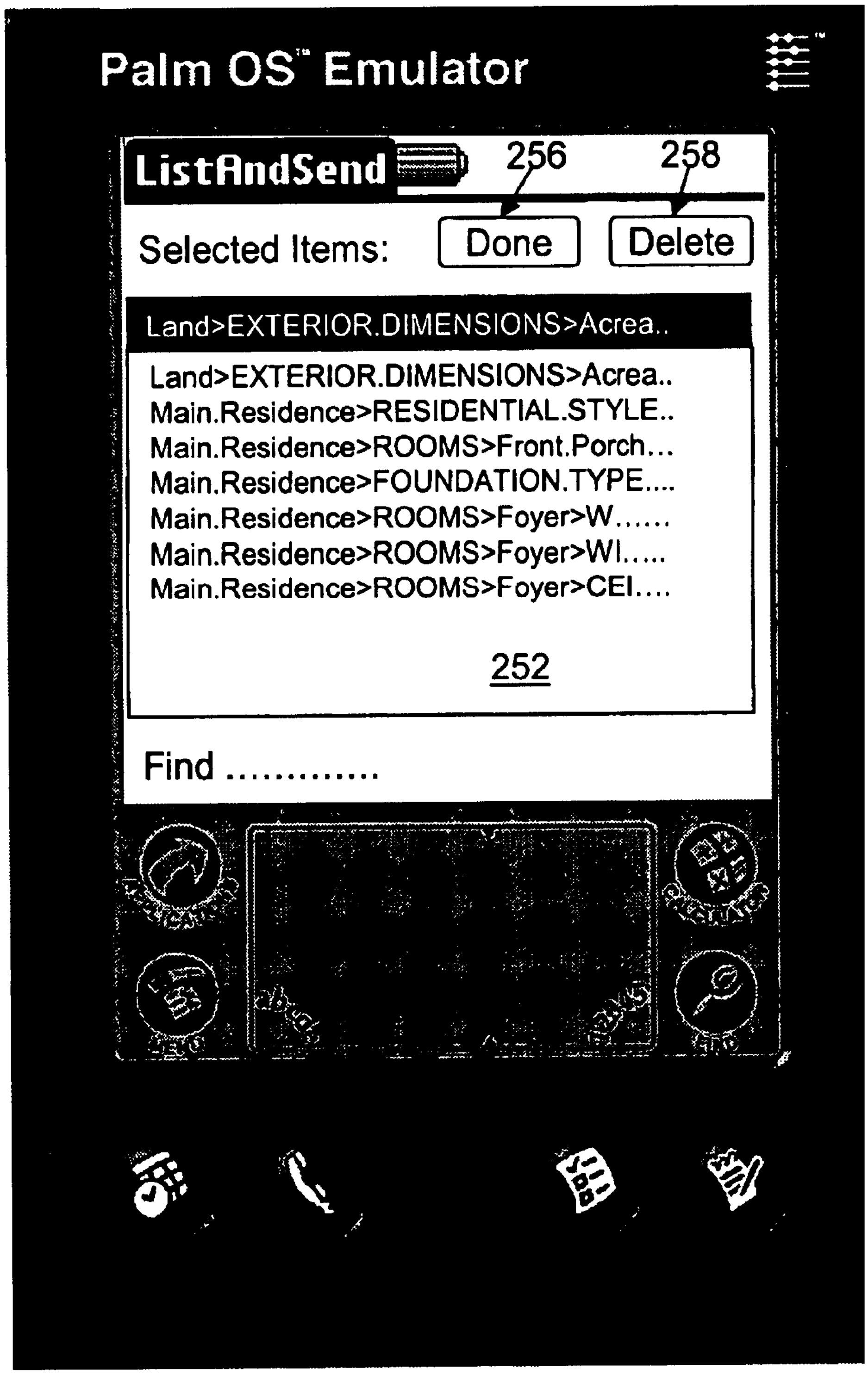

Referring next to FIG. 2F, when data entry is complete, a display screen 252 indicates a hierarchical listing of selected items in a given record. Display screen 252 contains the fields stored in this record and offers the option to complete the operation by indicating done 256 or alternatively selecting delete 258. Selecting delete 258 will begin the sequence for deleting a record, subject to a confirmation prompt generated by the program.

When the user, typically a real estate agent, has completed entering the data, the agent indicates, done. The program then executes a validation subroutine according to the XML definitional document which parses the fields for correct data entry. In the event that a field is incomplete or unacceptable to the parsing definitional document, an error message will be displayed prompting the real estate agent (in this example) to return to the data field identified as erroneous in order to make corrections or additions. To provide an example, if the realtor or the real estate agent completed data fields indicating there were three bedrooms in a house, but failed to enter the room dimensions for bedroom number one, there would be an obvious error in the parsing step, as this will be identified as required information in the definitional tables governing the parsing step. Thus, the omission of these dimensions would cause the parsing algorithm to prompt the real estate agent during the validation step to return to the offending data entry field. The agent would then insert the missing information or, alternatively, delete the room as an item perhaps incorrectly selected in the first instance.

Figure 4:
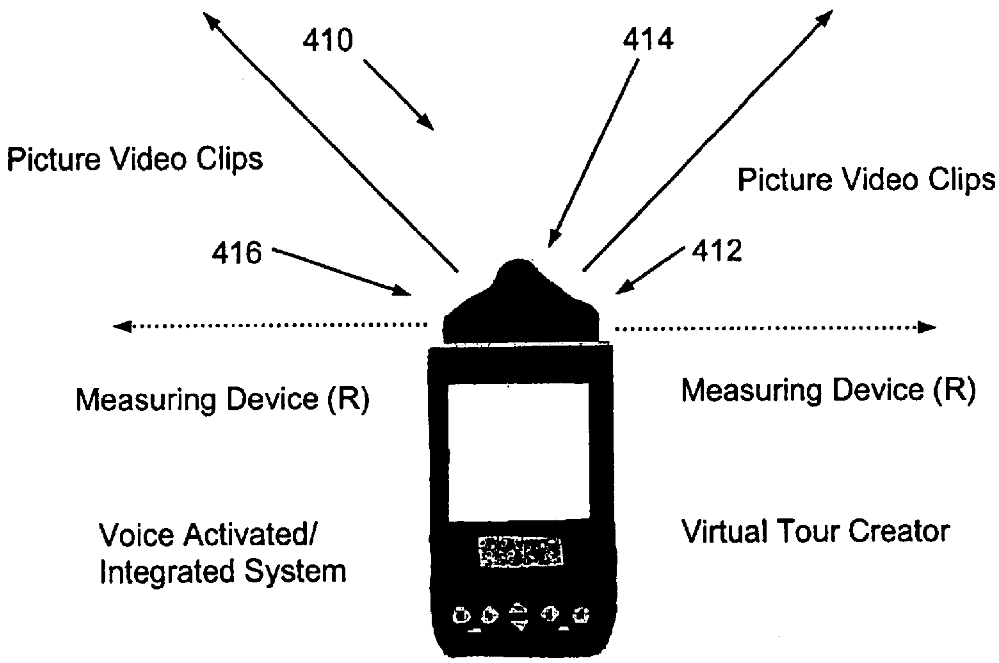
FIG. 4 shows an alternate embodiment of the invention having attachments connected to the handheld computer.

In an alternate embodiment, as illustrated in FIG. 4, a digital recording tool such as a handheld PDA 410 may optionally be equipped with an attachable infrared (IR) measuring device 412 or with an attachable digital imagining means, such as a camera 414, or both. The PDA 410 in this illustration includes the combination with both attachments 416. The real estate agent would thus be able to measure a room by pointing the IR measuring device at two points on opposing walls, for example, and selecting the calculate function to obtain the room dimension.

Additionally, as the agent is touring the residence or structure, he or she may use the camera 414 to capture a digital image, which may then be stored and identified with another data address for later reference in association with a "virtual tour." By "virtual tour," what is meant is a computer-generated image sequence which illustrates a real estate listing to the user, a room by room, in one or multiple images if they are available.

Using the embodiment illustrated in FIG. 4, a real estate agent may enter a property and immediately begin recording data. The application running on a digital recording tool such as a PDA 410 will prompt the agent to enter data according to the recording process set forth in the XML application. The data entry will be streamlined and the integrity insured by the method of the menu- or picklist-driven, step-by-step data entry system. The PDA 410 has a plurality of hardware attachments including the above-described imaging means such as camera 414, IR measuring device 412 and/or the combination of the two. Optionally, the digital recording tool may have an integral voice activated system for operating the program, making selections and data entry by way of voice commands which the digital recording tool can interpret. Digital images and digital audio clips may be stored in a database similar to a text data entry and associated with the listing so that an agent or potential home buyer may view a virtual tour of the premises complete with text description, video and audio descriptions that will enhance and simplify the process of real estate buying and selling.

The above-described invention is not limited to data entry by way of handheld computer, but includes accessing a hierarchical database as well. The information gathered through the efforts of real estate agents are transferred by way of computer, direct link, Internet or other data transfer means into the hierarchically arranged database. The method of accessing the database involves creating an application consistent with an XML definition document which translates between a relational database and the hierarchical database. For example, multi list organizations around the country compile and organize in a variety of formats, listing information for regional real estate databases. Because the relational databases are not standardized, they are not typically compatible from one database to another. However, the present method enables the communication between existing multi list relational databases to the hierarchical database by means of cross referencing fields to the hierarchical database. Thus, a multi list organization in Western Pennsylvania, for example, may record in their relational database information which is not typically utilized or recorded in a relational database used in the Metropolitan Washington, D.C. area. The hierarchical database with the unlimited expansion capability to add subcategories can accumulate all conceivable relational database fields in a hierarchical database that can be translated to virtually any multi list database, whether relational or hierarchical, throughout the United States or other countries. Thus, the flow of information from the realtor's handheld computer goes back to a centralized single database, to which multi list agencies may subscribe, to download periodically updated listing information. Multi list agencies in turn may publish or make electronically available the information obtained from the hierarchical database which is the present invention, formatted to fit their relational database format. The relational database is optional. A subscribing multi list agency may choose a hierarchical format for display and publication as well, which is more flexible than the relational database structure for transferring, modifying, accessing or storing information. The subscribers to the database may download data to a local computer. The web application allows subscribing agents to view, add and edit listings.

XML Handheld Application

What follows is a portion of the XML source document from one embodiment of this invention that defines the available selection elements or picklist items in the handheld computer application. The XML version employed in the present invention conforms to standards set forth by the National Association of REALTOR®s for XML standards and requirements. The invention in the embodiments described below may communicate electronically with any XML-compliant organization within the industry.

It should be understood that this is an example of a portion of the document and is not intended to set forth selection elements in their entirety:

The original XML program is translated into two files which reside on the PDA. This translation is performed by a POSIX® C application, which can be built and run on any POSIX® platform. (POSIX® is a standard created by the Institute of Electrical and Electronic Engineers (IEEE), in IEEE Standard 1003, and refers to Portable Operating System Interface. The embodiment of the present invention utilizes C programming language with POSIX®.) It will be readily appreciated by one skilled in the art that the other operating system interfaces may be adapted to this program, and this particular computer executed set of instructions are given by way of example and are not intended to limit the invention to any single set of programs or language.

In the translation process each "node" is assigned a 16-bit number. A node is either a category or an item. The outermost category, or the root node, is always zero. All additional categories are numbered sequentially, followed by all of the items.

The "name" field of each node is stored in the handheld database file named "GeneratedStringResources.pdb". The names are stored in variable length records, each record containing 30 names, separated by NULL characters. The names are in order by node number. Given a node number, the associated string is found by:

Record=Node/30

StringInRec=Node % 30

If an item is assigned a "datatype" field, a '\r' character is appended to the name, followed by the datatype string. The datatype string is stored in the name database. A database file resides on the PDA named "GeneratedNodes.pdb" is created which contains the content information for each category. The node structure is as follows:

- 16-bit parent node number
- 8-bit flags currently: the only used flag bit is bit 1 which indicates that the node is single selection
- 8-bit number of children variable length array of 16 bit child node numbers Each record contains 30 node structures, ordered by node number. Node structures are only stored for categories. Given a node number, a node structure is found in a similar manner to a name string.

The parent node number of the root node (node number 0) contains the total number of categories in the system. This method permits easy differentiation between items and categories. The node is a category if the node number is less than the number of categories; it is an item if the node number is greater than or equal to the number of categories.

Using the data files described above, the handheld application presents the information to the user hierarchically.

The handheld application is preferably written in ANSI C, programming language, although any programming language may be used. The application uses the PalmOS v3.1 API, and is built in the Cygwin B20 environment. The application uses standard forms, lists and menus. The application can also present a fully specified list of selected items.

Navigation through the hierarchy is supported by the node structures described above. The user is prompted to provide a listing name. The listing name is used to name a database in the PDA in which the user's selections are recorded. The selections are kept in node number order via insertion. A selection record has the following structure:

16-bit selected node number 16-bit parent node number

If the item is a "specify" item (determined by the presence of a '\r' character in its name) then two additional fields follow:

16-bit specify data length variable length array of characters of specify data

The selections are stored one per record. Records may be inserted and deleted by the application. "Specify" editing is accomplished by deleting the record with the old data and inserting a record with the new data.

The PDA is linked via a HotSync® conduit to a larger computer system, such as a notebook computer, or a web server whenever the HotSync® function is triggered. HotSync® is the registered trade name for a sophisticated method of linking between a PalmOS handheld computer and a more substantial notebook, desktop, or other computer. Such a link can be done using a so-called HotSync® cable, or using a wireless connection. The HotSync® conduit is a 32-bit Windows® DLL file, written in ANSI C, using the Palm® CDK 4.02 API, and built in the Cygwin B20 environment. The HotSync® conduit is dependent on the Microsoft® C Runtime DLL, which should already be in place. The HotSync® executable also depends on Microsoft Runtime DLL. The HotSync conduit is also dependent on the Windows® socket DLL for Internet access.

When the conduit is activated, it searches the PDA for any listing databases. If none are found, the conduit takes no further action. If a listing database or databases are found, the conduit presents the user with a dialog display in which the user can enter a user ID and password and select which listings to send to the ListAndSend™ web application server. The selected listings (if any) are then translated back into XML and transmitted to the server. Upon successful transmission, and if the user selected the option, the transmitted listing databases are removed from the handheld PDA.

The server address or Uniform Resource Locator (URL) and the XML Document Type Definition (DTD) URL are stored in the registry and can be modified via the HotSync® menu options.

Internet Application

Figure 3A:
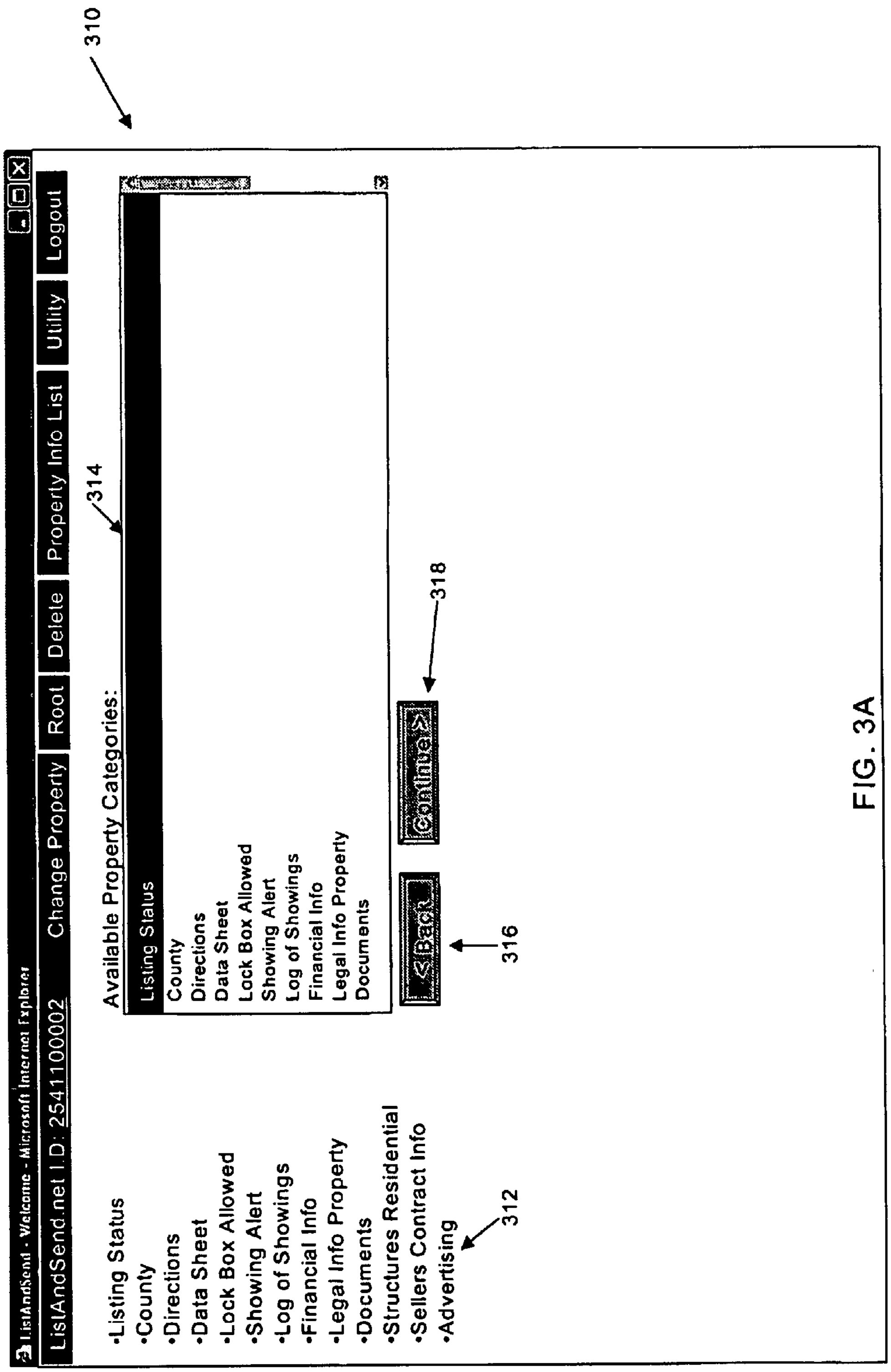
FIGS. 3A–3C show an Internet display of an embodiment of the present invention.
Figure 3B:
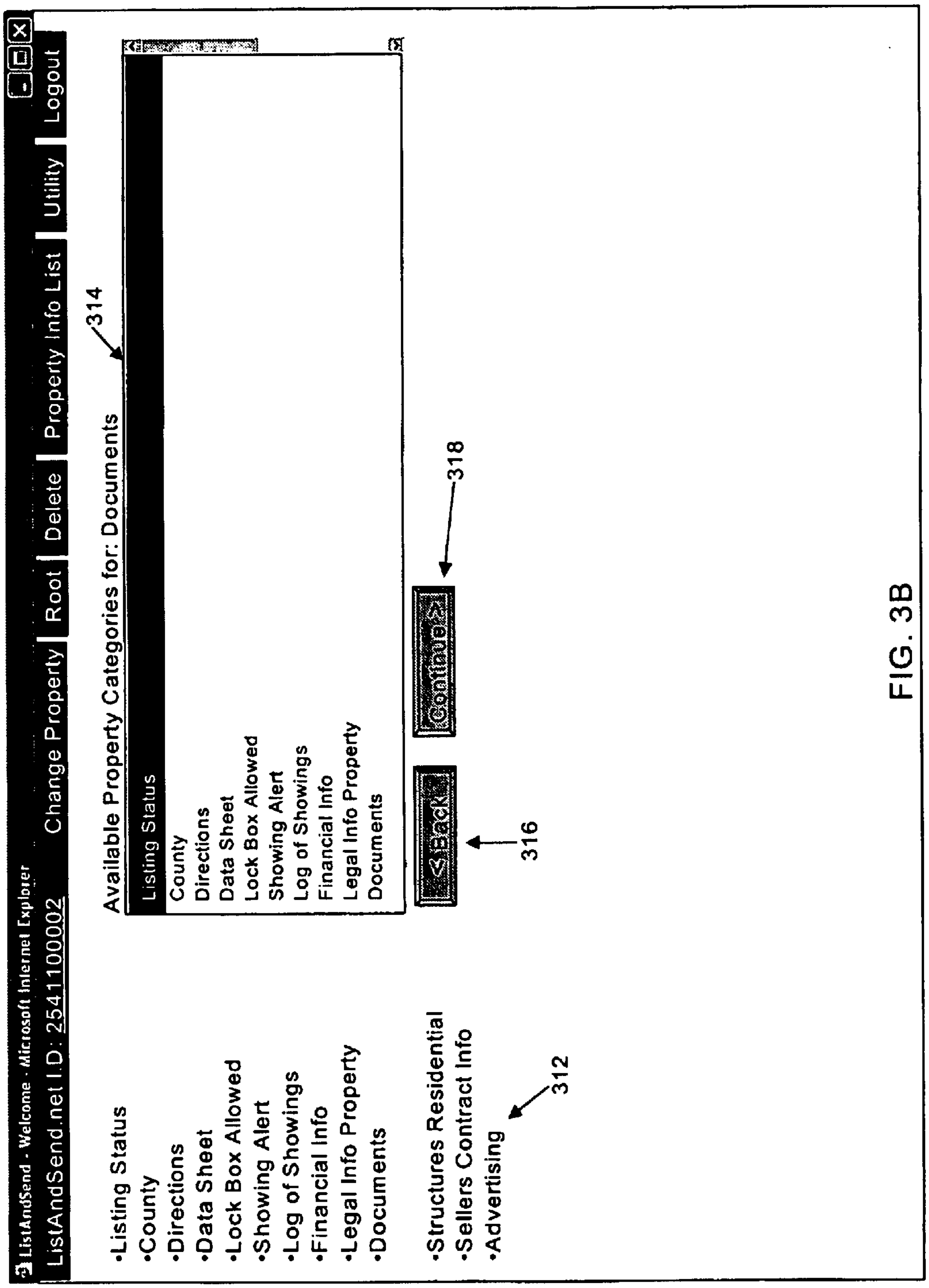
Figure 3C:
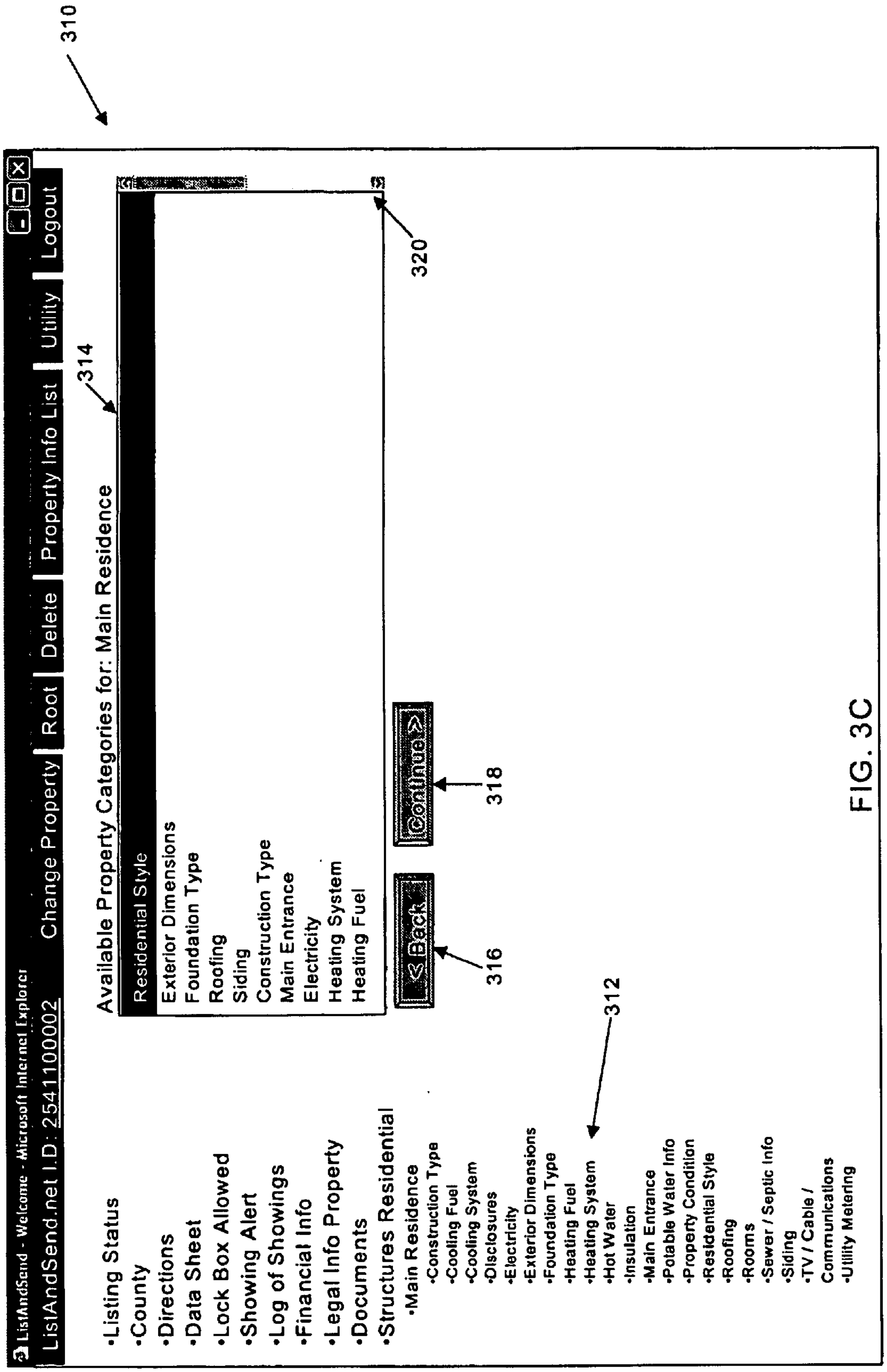

Referring now to FIGS. 3A–3C, series of web pages applying the present invention are illustrated. The screen display available through an Internet connection is generally designated as 310. At the upper left corner of the display is a picklist 312 displaying, in this instance, the highest level of options related to property. To the right of the picklist on the screen is showing an available property categories window 314 which in this instance mirrors the picklist 312. A back button 316 gives the user the option of returning to the previous selection window. A continue button 318 allows the user to select the highlighted category of window 314, and this example being the "Listing Status".

FIG. 3B shows a next highest level category in which attributes for documents are displayed in available attributes window 314. The picklist 312 has been expanded by the selection of the category documents. The available attributes for "Documents" are displayed in window 314. The partial listing includes:

Covenants and restrictions;

Conditions;

Easements;

Plat;

Boundary lines survey;

Survey-house location;

Survey-stake;

Survey-tree;

Right-of-way; and

Site plan.

The back button 316 and continue button 318 are available for navigating forward and backward to the next level of program.

FIG. 3C illustrates the web page application screen 310. The picklist 312 has been expanded under the categories "Structures Residential>Main Residence" to show the category options available under Main Residence. The categories window 314 for selecting a category shows a partial listing wherein items for selection in the display window 314 are as follows:

Residential style;

Exterior dimensions;

Foundation type;

Roofing;

Siding;

Construction type;

Main entrance;

Electricity;

Heating system; and

Heating fuel.

A scroll bar 320 associated with categories window 314 enables the user to display additional categories from the total listing.

In another embodiment of the Internet application, the user interface screens are shown in FIGS. 5A–5L. It should be understood that data and selection items are presented in substantially similar arrangements for all levels of the database. The figures shown here are provided as examples and are not intended to provide an exhaustive set of available user interface screens.

Figure 5A:
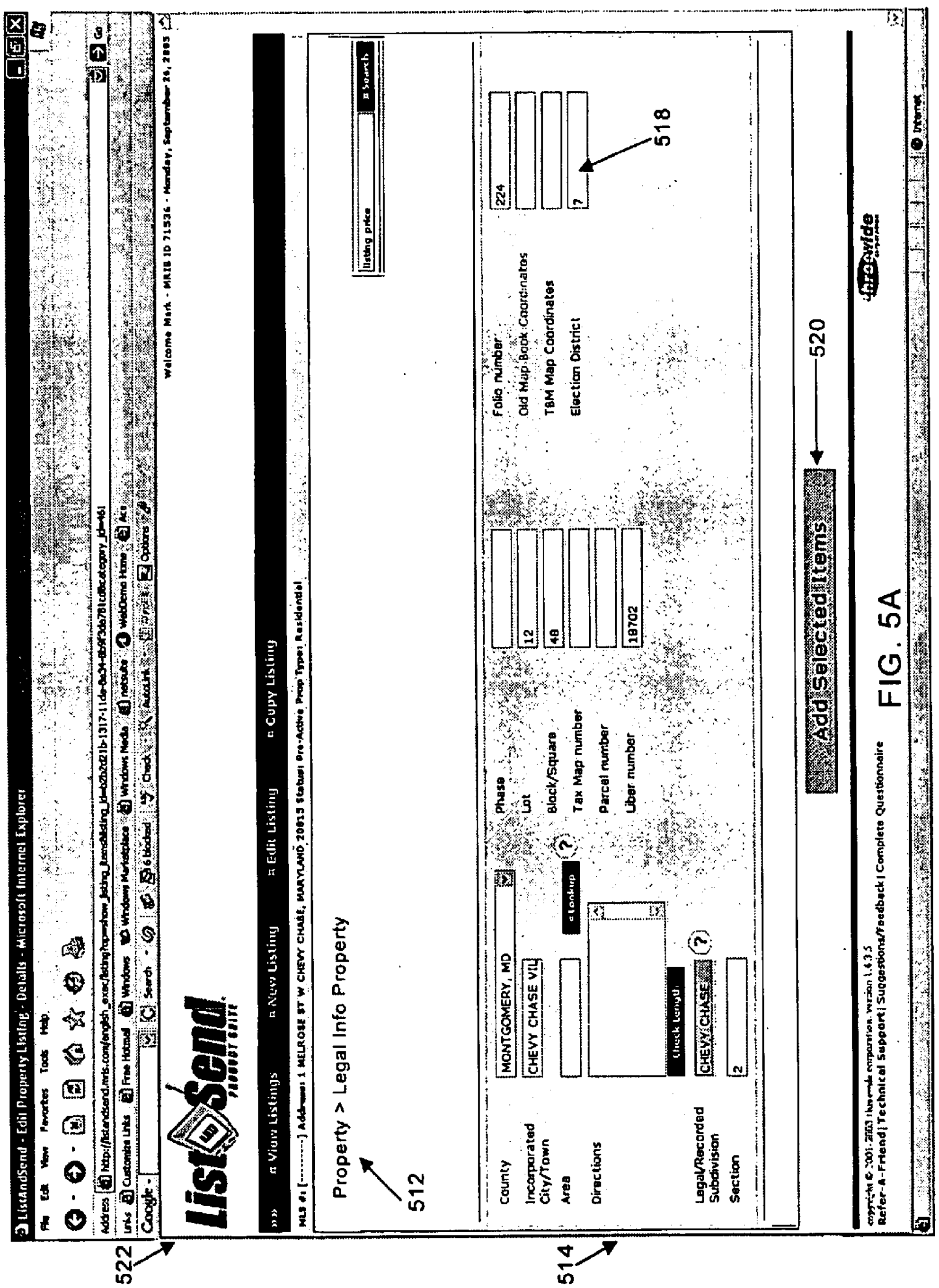
FIGS. 5A–5L show a series of sample screens for Internet user interfacing in an alternate embodiment.

FIG. 5A illustrates a screen, generally designated as 510, for Current Category "Legal Info Property" hyperlinks 512. A hyperlink is a special area on a web page that can be activated (usually with a mouse). The hyperlink can appear as text or graphics. Most hyperlinks direct the user to another HTML document or a web page.

A plurality of selection items 514 is provided as check boxes 516. By selecting any of the check boxes, the item is added to the record for the associated property listing. Text windows 518 are provided for entering a value, for example, the commission percentage applicable to the associated property listing. A button 520 is selected after the user completes the information on the screen 510 to add the information to the current record.

Figure 5B:
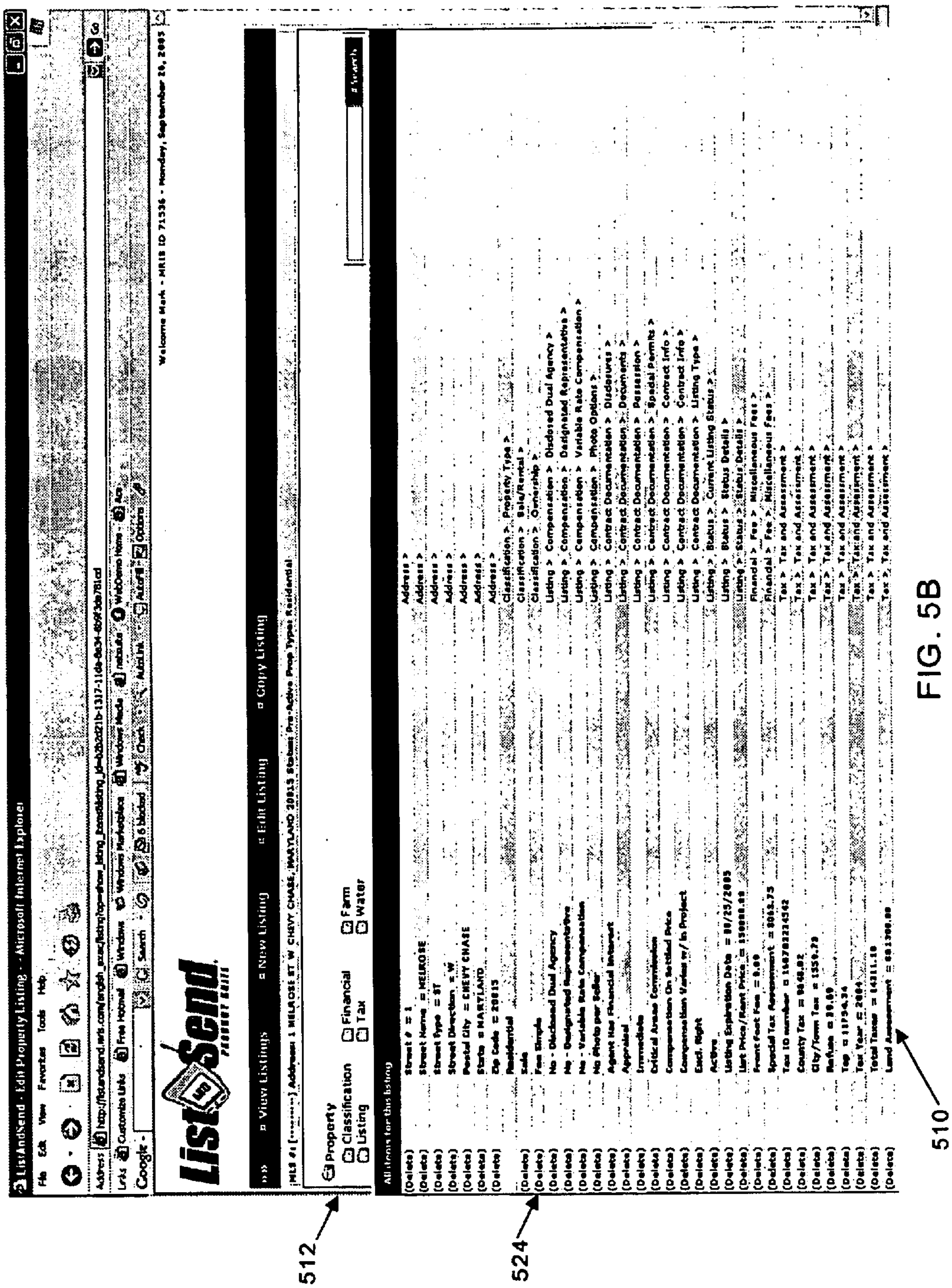
Figure 5C:
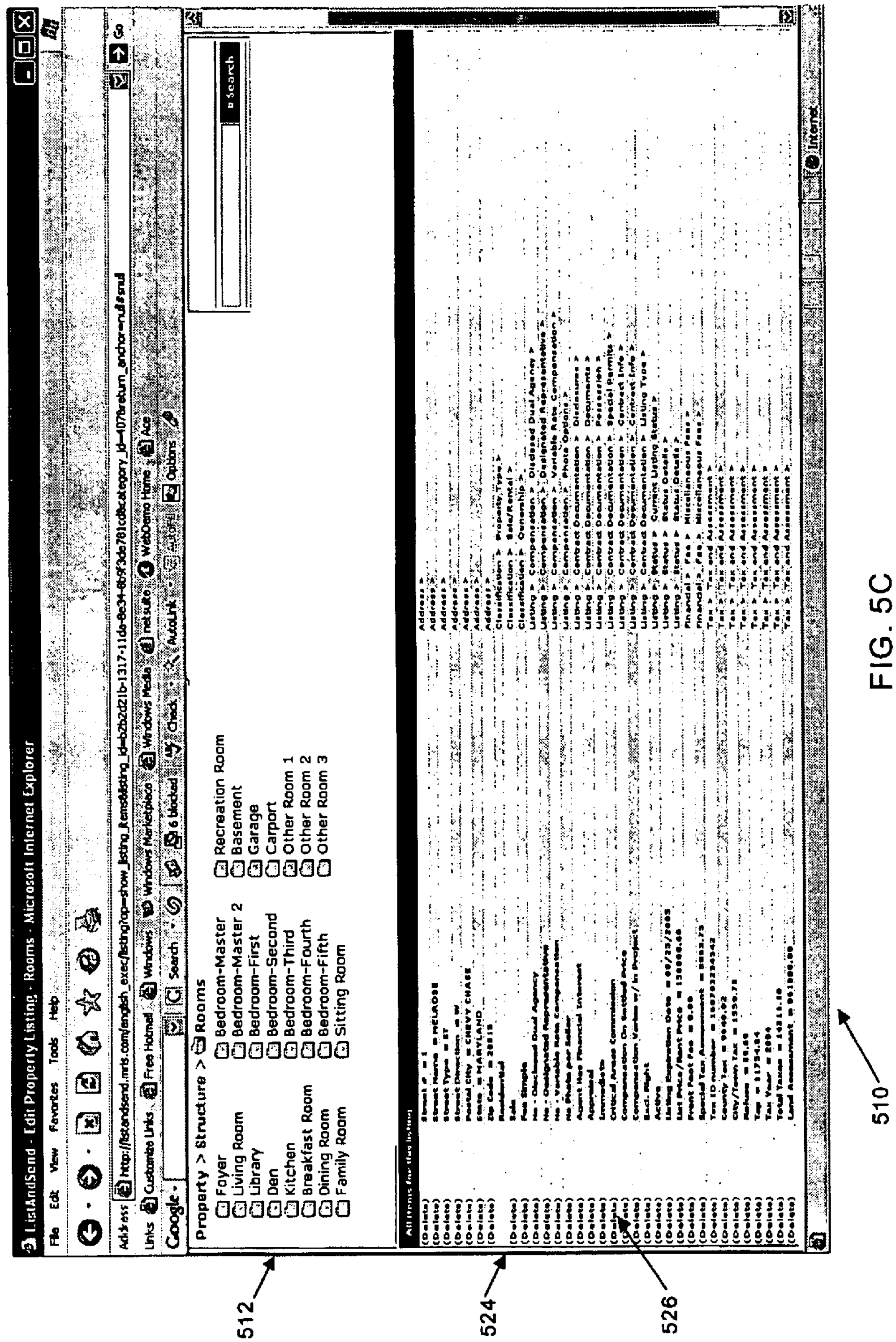

A navigation bar 522 is typically provided for all screens in FIGS. 5A–5C, with a plurality of hyperlinked selections for navigating through various other windows. The preferred hyperlinks include "View All Property Listings"; "Create a New Listing"; "Delete a Listing"; and "Edit Account Info."

FIG. 5B shows the screen 510 with hyperlinks 512 to subcategories as follows:

Listing Status;

County;

Directions;

Financial Info;

Legal Info Property;

Structures Residential; and

Sellers Contract Info;

If other subcategories are desired, they may be added via the system administrator of the hosting entity, or other authorized person, provided that the data has been assigned an identifier compatible with the database structure. It is contemplated, as noted above, that new categories will evolve based on experience. Due to the flexible nature of the hierarchical database structure, the new categories may be inserted without the need to revise all of the associated software programs that interact with the database.

On the lower half of the screen, a listing 524 of all data path information for the associated listing is displayed. Each individual item of data in the listing is shown with the path designations so as to provide a trail for associating the data with the relevant category and subcategory.

Referring next to FIG. 5C, a set of hyperlinks 512 relating to a third level category, ROOMS, is shown as follows:

| | | |
|---|---|---|
| Front Porch | Upstairs Hall | Rec Room |
| Foyer | Loft | Deck |
| Main Hall | Attic | Enclosed Porch |
| Living Room | MBR2 | Exercise Room |
| Library | MBR3 | Garage |
| Home Office | BR1 | Greenhouse-attached |
| Den | BR2 | Patio |
| Kitchen | BA1 | Indoor Pool |
| Pantry | BR3 | Screened Room |
| Dining Room | BR4 | Apartment/Studio |
| Family Room | BR5 | Apartment Living Rm |
| Great Room | BR6 | Apartment Kitchen |
| MBR | BA2 | Apartment Dining Rm |
| MBA | BA3 | Apartment BR1 |
| Mud Room | Balcony | Apartment BA1 |
| Utility Room | Bonus Room | Apartment BR2 |
| Laundry Room | Basement | Apartment BA2 |
| Stairway | Root Cellar | Other/specify7 |

As with the previous screen in FIG. 5B, categories may be added or deleted by the system administrator as desired. On the lower half of the screen, the listing 524 of all data path information for the associated listing is displayed. Each individual item of data in the listing is shown with the path designations so as to provide a trail for associating the data with the relevant category and subcategory. Hyperlinks 526 are provided adjacent to each item in the associated record for deleting the item by clicking the delete hyperlink.

Figure 5D:
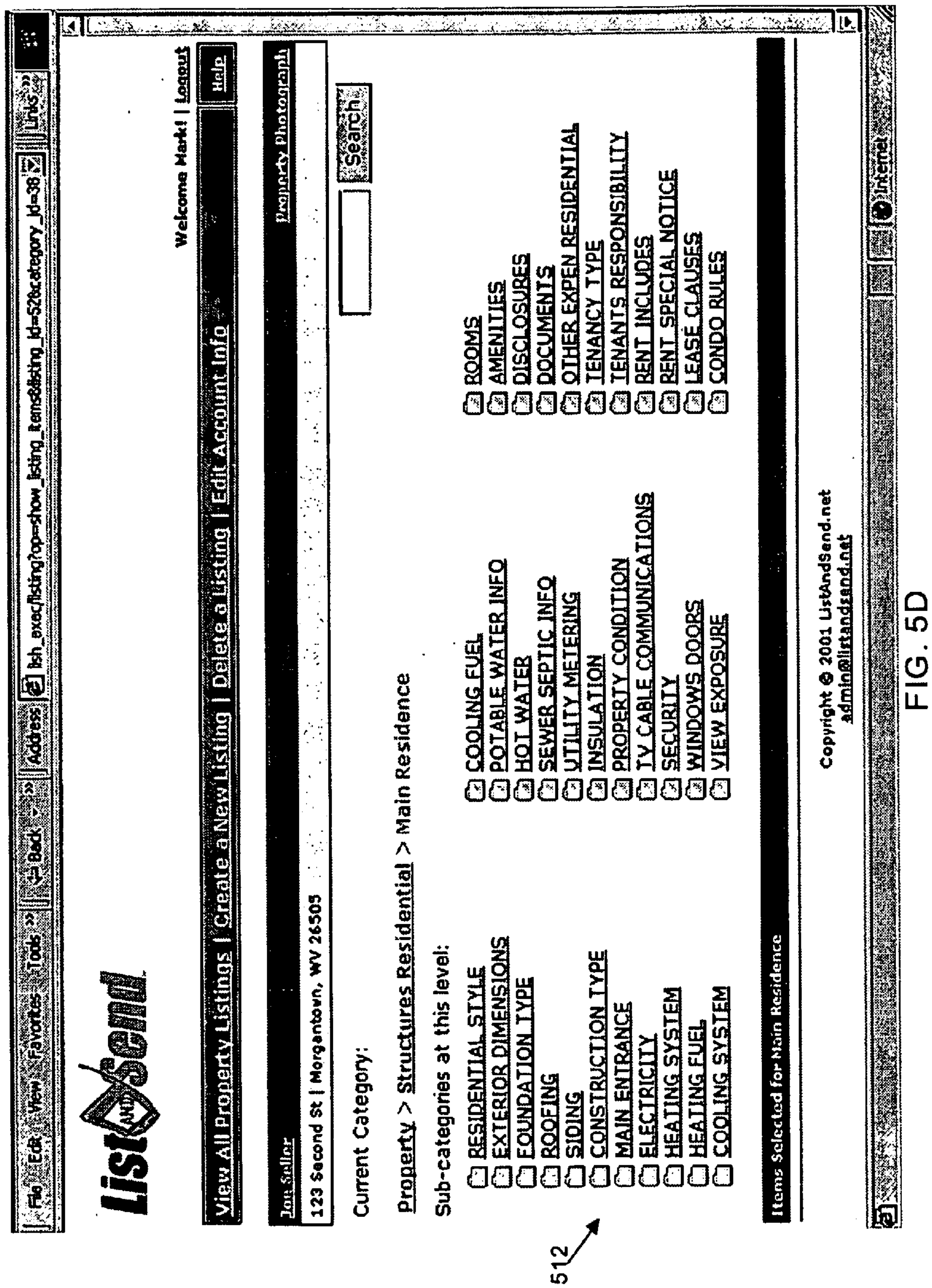
Figure 5E:
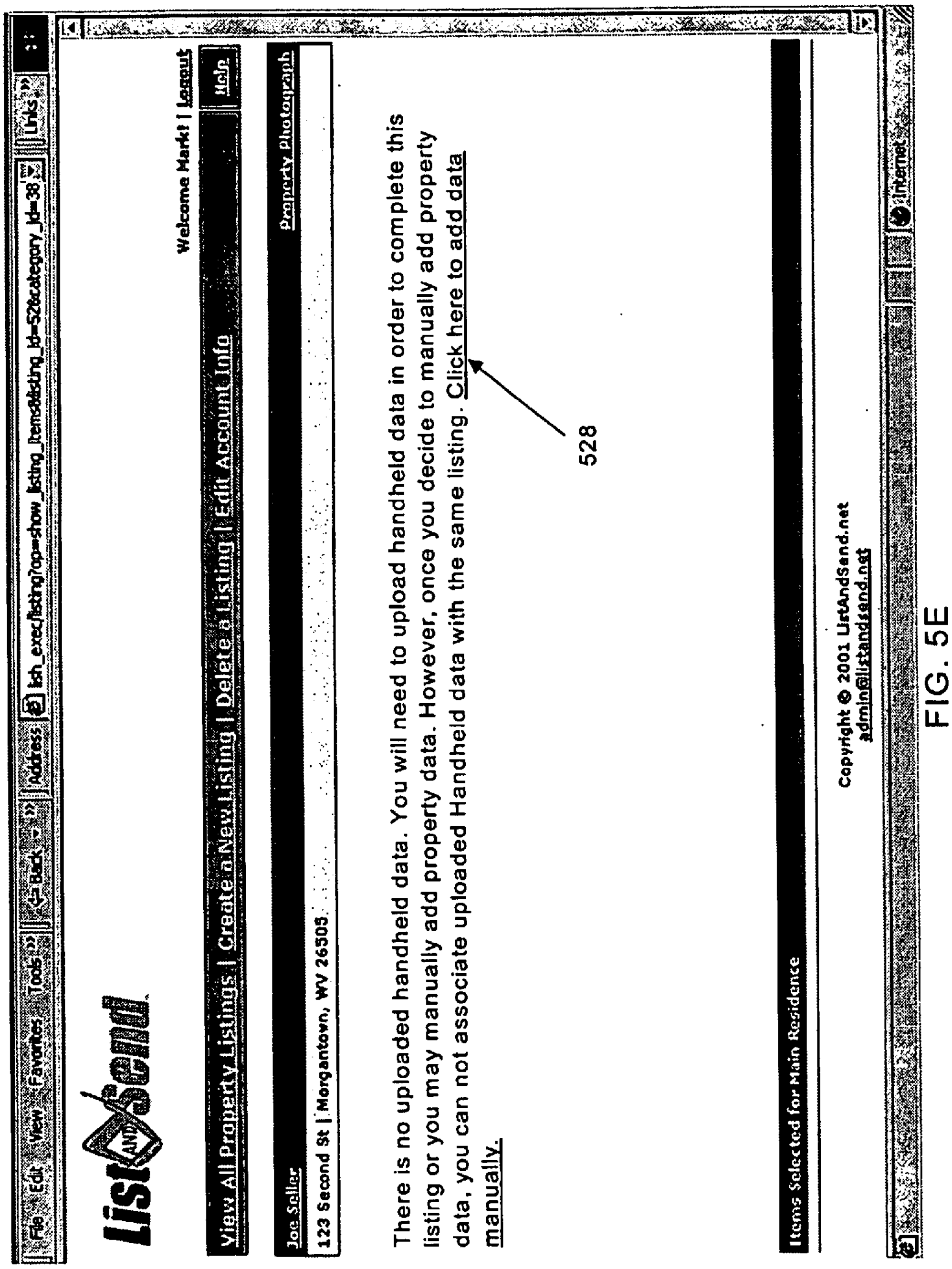
Figure 5F:
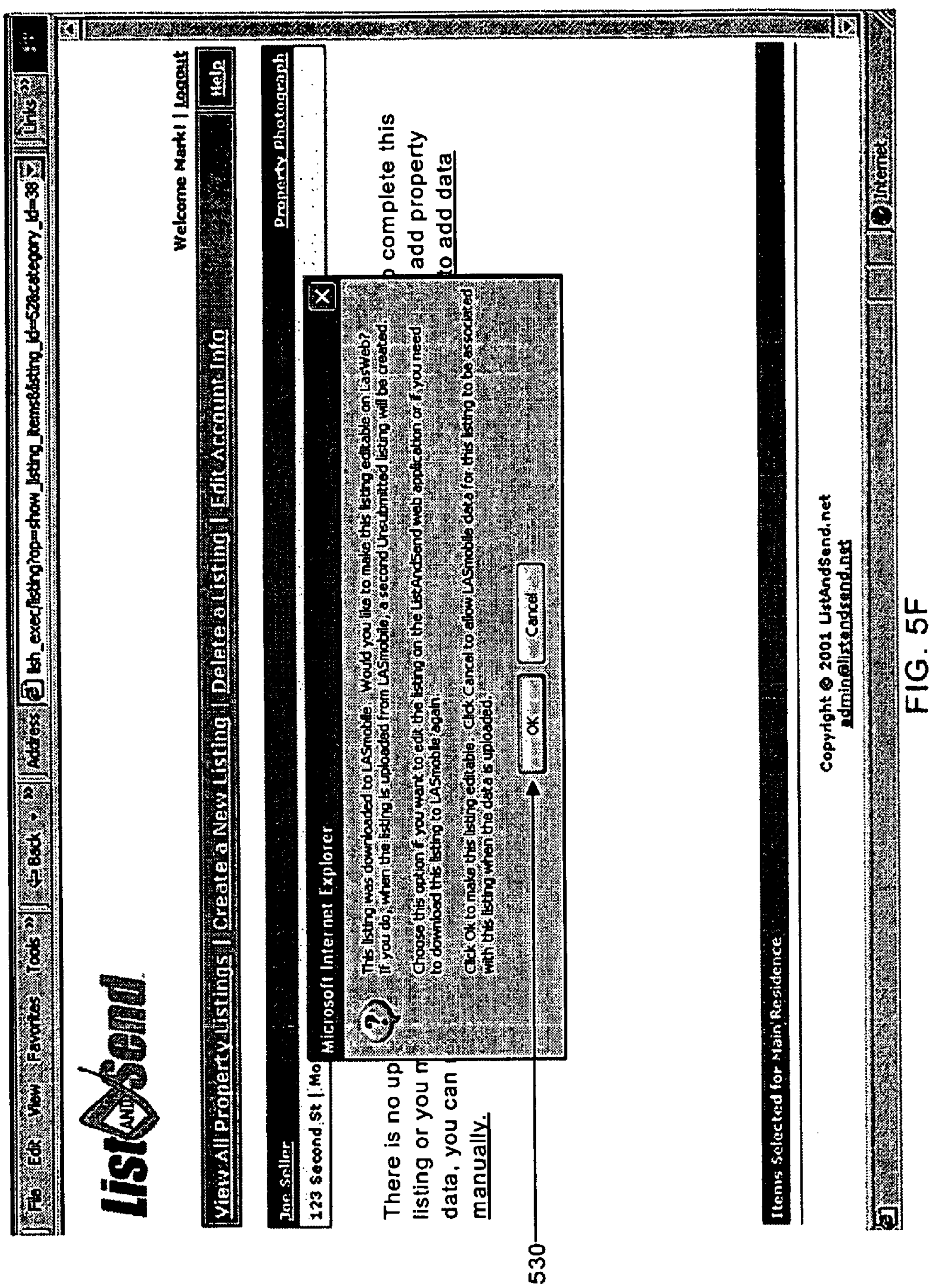

FIG. 5D sets forth a listing of hyperlinks 512 that are subcategories of the Main Residence Category. FIGS. 5E and 5F are interface screens for selection to add data manually via the Internet application using a hyperlink 528. Clicking the hyperlink 528 automatically launches a pop-up window 530 to require confirmation that the user intends to manually add data, along with a warning that handheld data may not be associated after manually adding data.

Figure 5G:
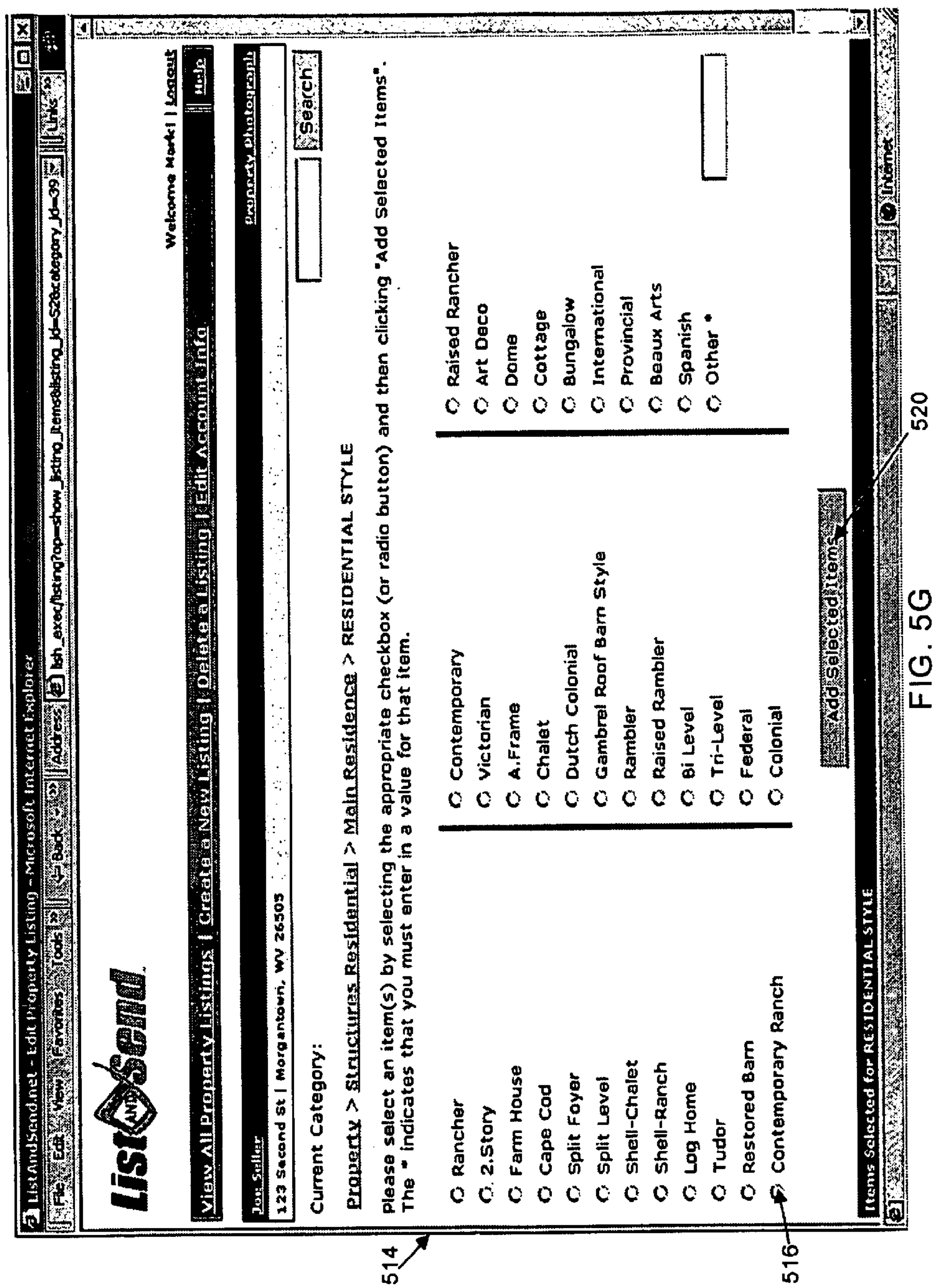
Figure 5H:
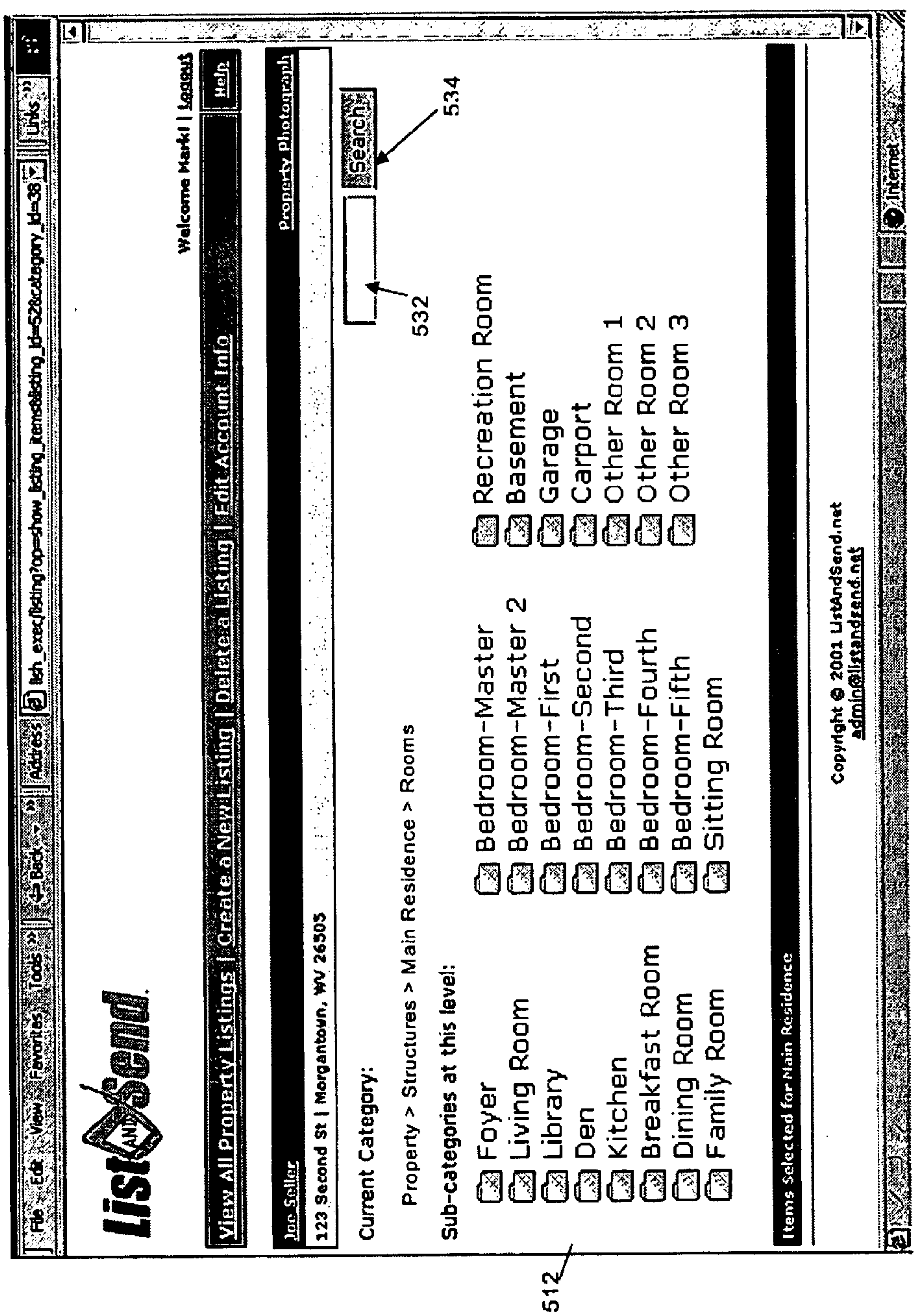

FIG. 5G is another picklist for selecting and adding attributes associated with the main residence. FIG. 5H depicts a set of hyperlinks 512 for subcategories associated with the rooms in the main residence.

Figure 5I:
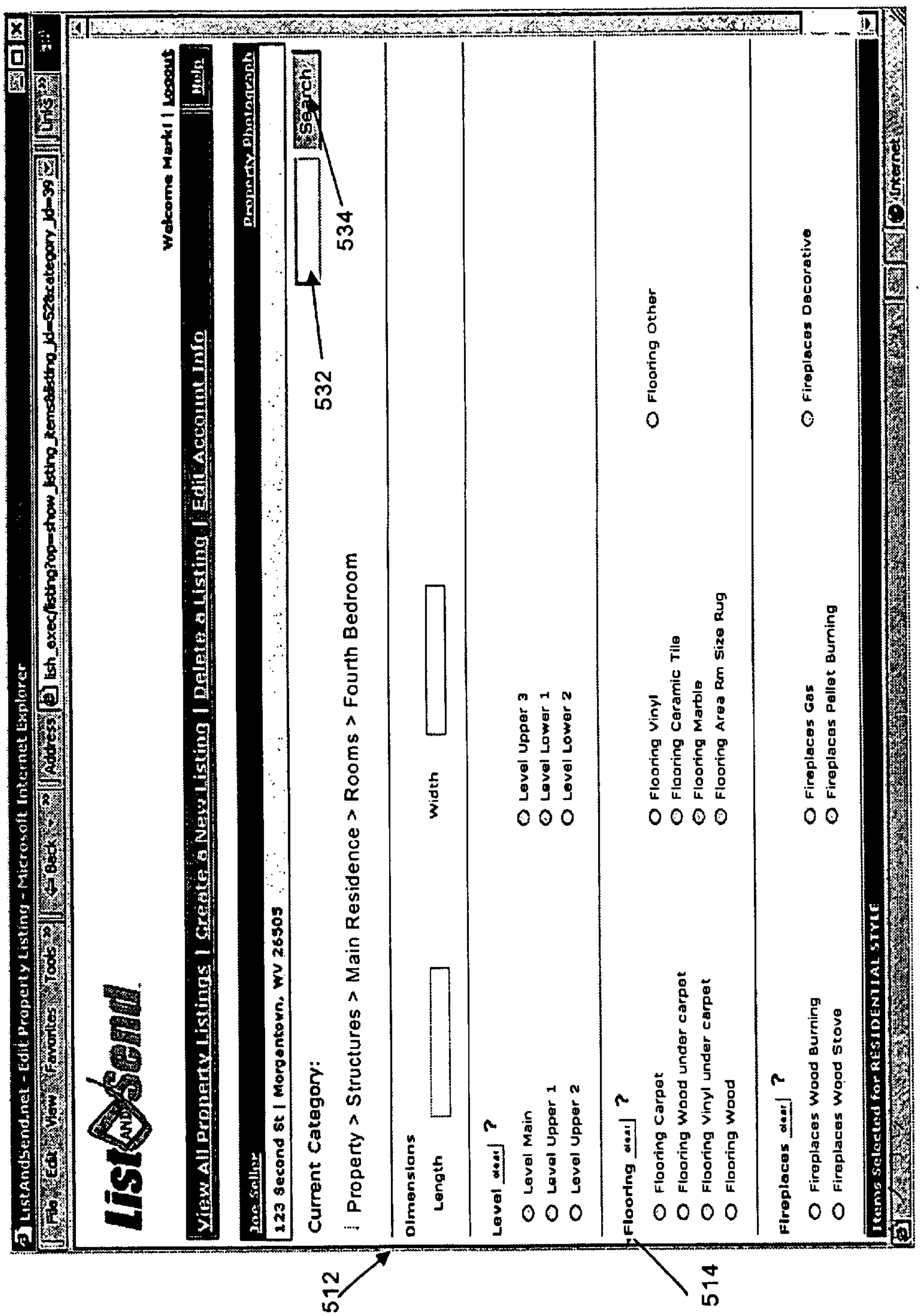

FIG. 5I is another picklist for selecting and adding attributes associated with the 4th Bedroom in the Rooms category. A search element includes a text entry window 532 for specifying a search term and a search button 534 that activates the search function to locate all records in the category that have a matching search term.

Figure 5J:
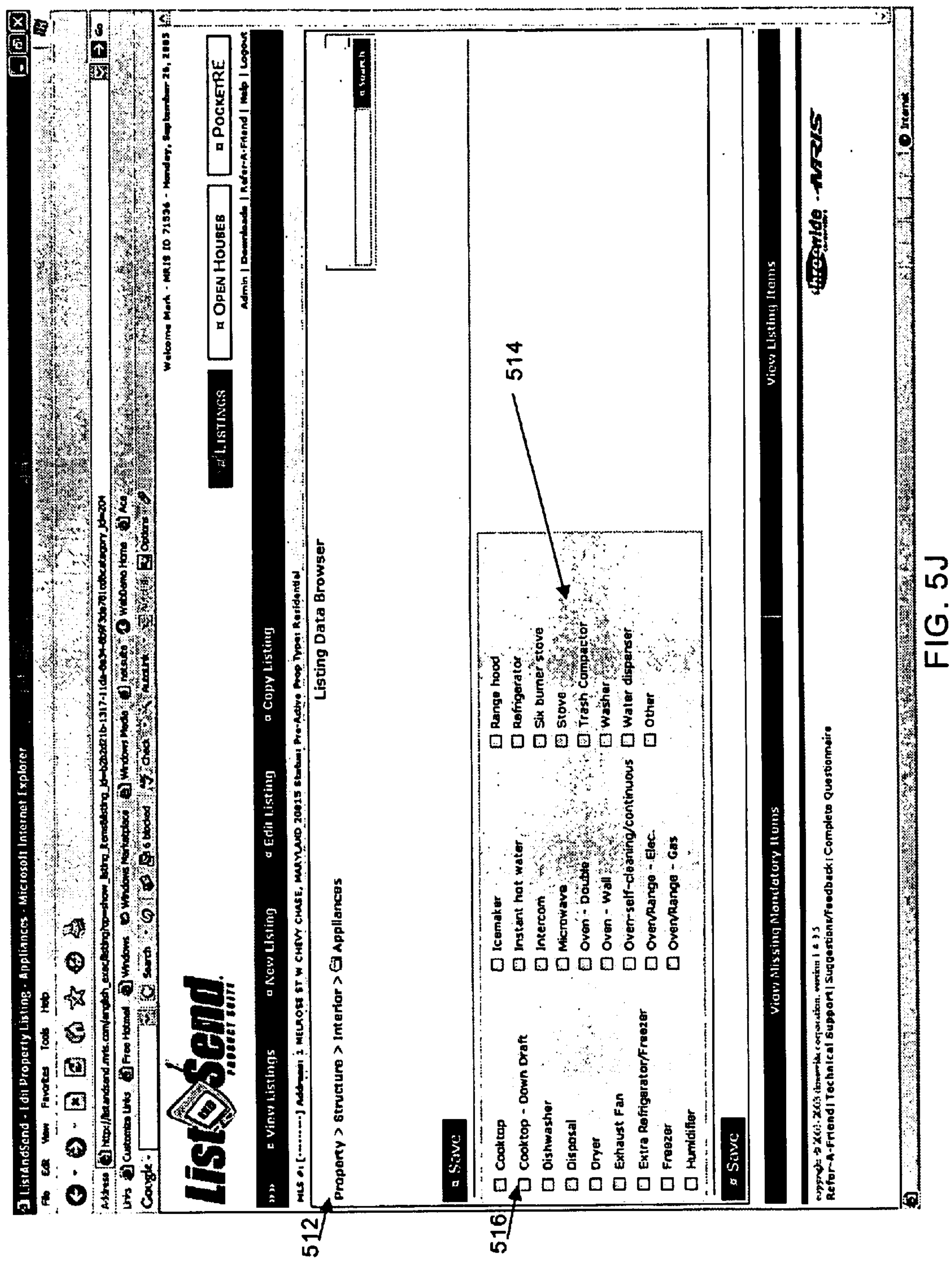

FIG. 5J illustrates a typical set of selection items 514 associated with appliances in a kitchen of a main residence. Descriptors are selected by clicking the relevant check boxes 516.

Figure 5K:
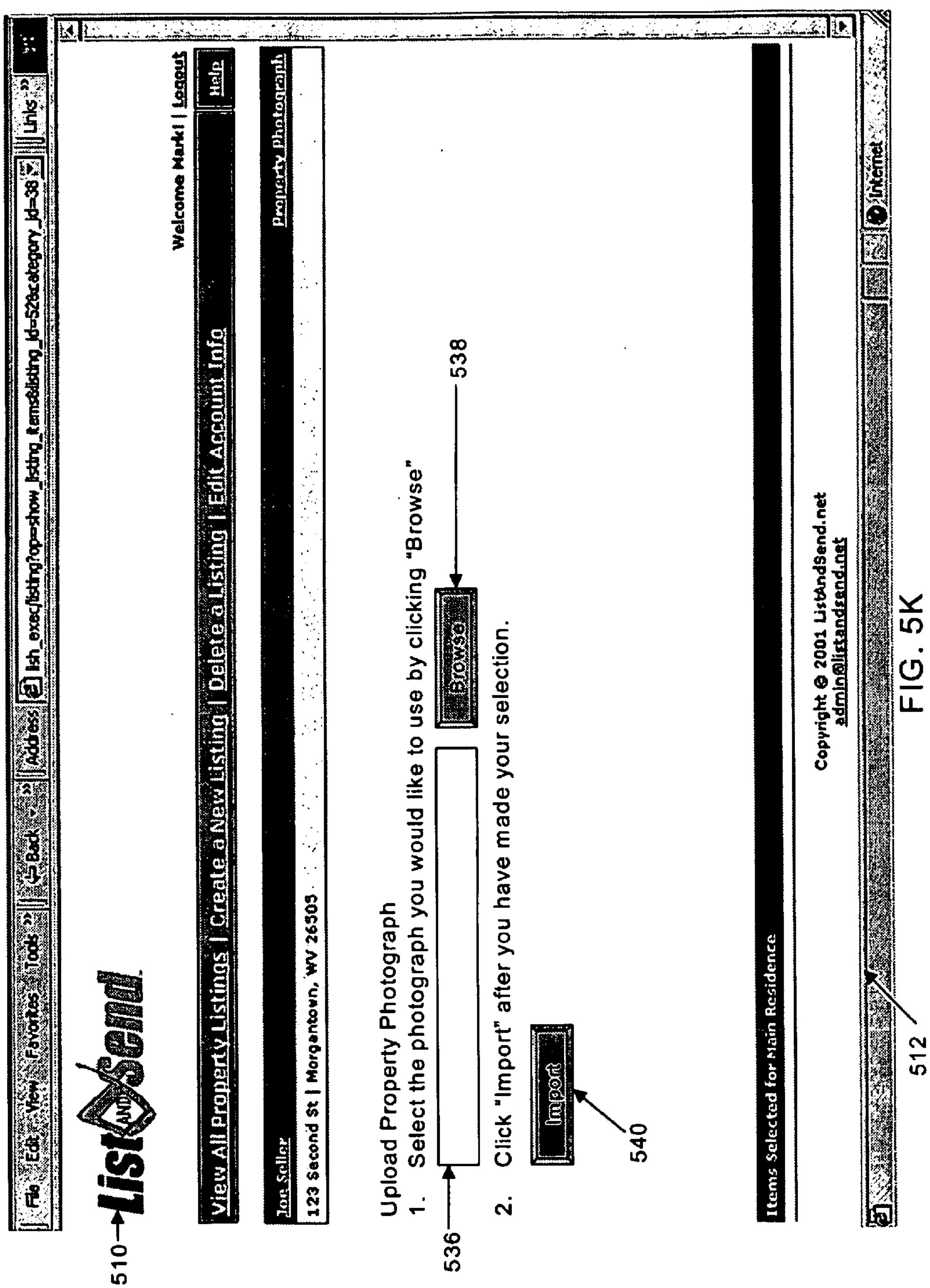

FIG. 5K is an interface screen 510 for providing a Property Photograph, or an image of the subject property. A text box 536 is provided for entering a filename associated with the photograph or other image (not shown). A selector button 538 permits the user to navigate via the system file manager to insert the appropriate image filepath and filename automatically. Another selector button 540 automatically imports the specified image into the current record when the user clicks over the button.

Figure 5L:
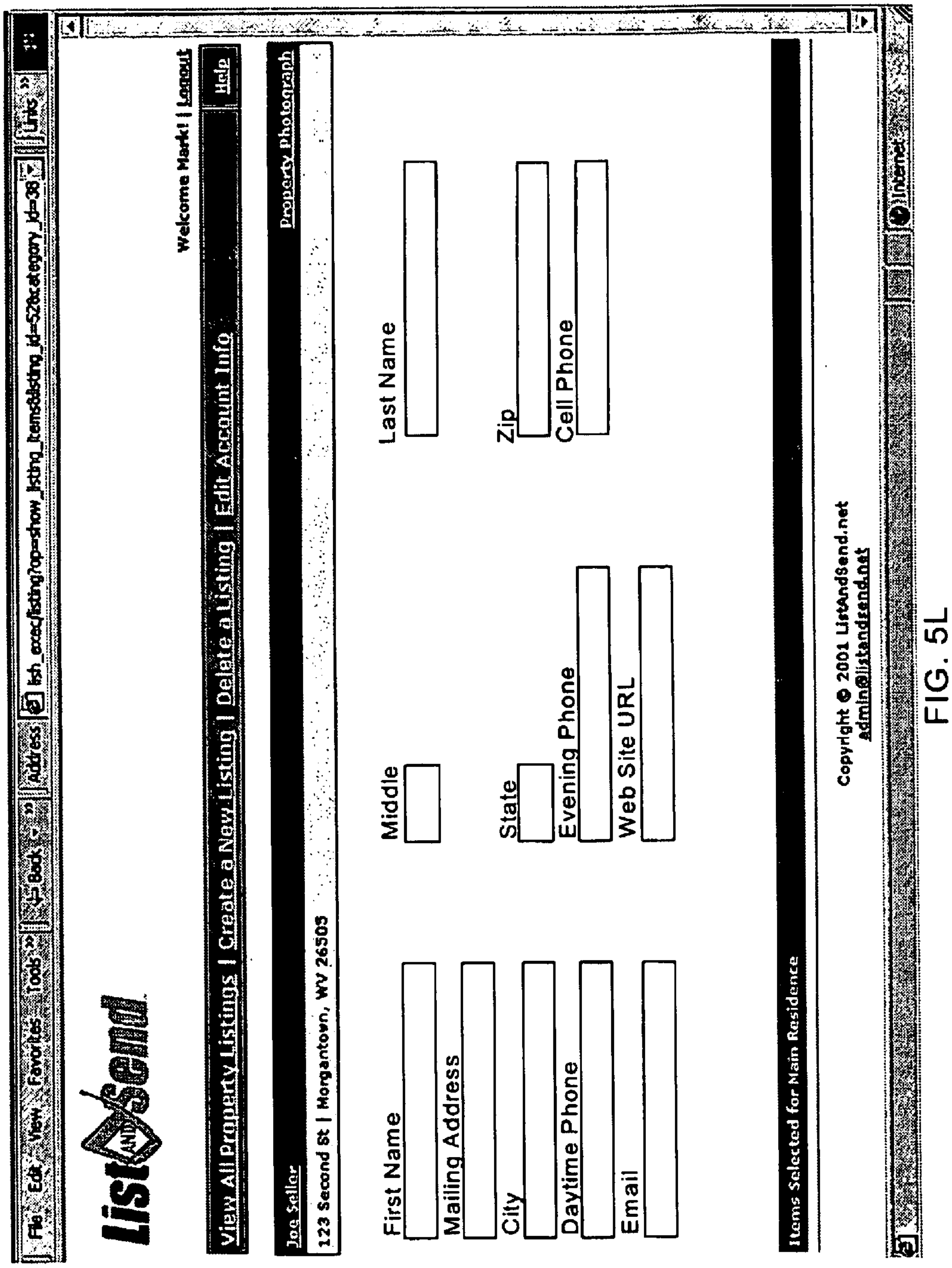

FIG. 5L shows an account editing screen for entering and modifying account information associated with the subscriber or subscribing entity. This screen is typically accessible through a secured gateway so as to prevent unauthorized users from accessing and modifying account information. By the nature of the invention, the database is proprietary and accessible only by authorized users, such as real estate multi list services, brokerages or agents. Different levels of access may be designated as well. Thus, an agent may be given permission to upload data, whereas a multi list agency may be able to generate reports, modify listings and set authorization levels.

Data Model

The data model of one embodiment of the present invention is modeled upon a Property, Structure, Room™ (P.S.R.) hierarchy. Each attribute of a real estate listing falls into one of those categories, or is a direct attribute of one of those categories.

The item is the basic building block of the database. The database contains a large quantity of predefined items (such as property type and square footage) that can be related to a listing. Each item is organized hierarchically into categories. The depth of this category hierarchy is kept to four or fewer levels. The categories are named in a consistent manner to make the data entry method intuitive for new users to the system.

Below is an excerpt from an XML file used to populate the picklist on the PalmOS or handheld computer. Ellipses refer to omitted choices for categories:

```
<Category name = "Main Residence">
    <Category name = "RESIDENTIAL STYLE" ORDINALITY = "SINGLE">
    <item name = "Rancher">
    <item name = "2.Story">
    <item name = "Farm House">
    <item name = "Cape Cod">
    ...
```

-continued

```
        </Category>
        ...
        <Category name = "ROOFING">
              <item name = "Shingle-Fiberglass">
              <item name = "Shingle-Architectural">
              <item name = "Shingle-Asphalt">
              <item name = "Shingle-Wood">
              <item name = "Shingle-Asbestos">
              <item name = "Cedar/Shake">
        ...
        </Category>
        ...
              <Category name = "Living Room">
        ...
                    <Category name = "WALL COVERINGS">
                                <item name = "Drywall"/>
                                <item name = "Paneled Walls"/>
                                <item name = "Wood"/>
                                <item name = "Vinyl Wallpaper"/>
                                <item name = "Plaster Walls"/>
                                <item name = "Brick"/>
                                <item name = "Masonry"/>
                                <item name = "Other*"datatype = "string"/>
...
                          </Category>
              ...
              </Category>
              ...
        </Category>
        ...
</Category>
```

Copyright Threewide.com 2001

The basic user data element of this system is a listing. Each listing contains location information and references to each property seller. After that, items are associated with listings, and those relationships are called listing items. A listing item can have a small piece of data associated with it (such as directions to the property or the actual number of square feet for a room). This data is stored in the database as a variable-length character field, but the data is always validated against a particular regular expression pattern dictated by the item's "data type". Items that have no data type cannot accept this additional data.

Users of the system, who are typically real estate agents, own and manage their listing records.

Currently, of this data is being stored in a database which is compatible for use with Structured Query Language (SQL), which is a computer language used to retrieve or update data by specifying columns, tables and various relationships between them, and then accessed by a Java Database Connectivity (JDBC) driver. Therefore, any SQL database accessible via a JDBC driver can be used to store data for the present system. Examples of such database formats include Oracle, Microsoft SQL Server and other commercially available database products.

Middleware

In the computer industry, middleware is a general term for any programming that serves to "glue together" or mediate between two separate and usually already existing programs. A common application of middleware is to allow programs written for access to a particular database to access other databases.

The middleware layer of the system in one embodiment of this invention is written in 100% Pure Java, using servlet technology to present data to its users. The logic is separated into a model-view-controller (MVC) architecture using entity classes for this data model (which correspond directly to the database entities), a high-performance template engine to generate dynamic HTML for our viewing model and Java servlets for our controllers.

The controller code validates any incoming data from the user via HTML forms and then delivers the appropriate data to a template engine for formatting into web pages. The entity classes are written as Java Beans, with accessor and mutator methods for each piece of data. Objects identified as "static" (such as categories and items, which do not change over time) are cached within the servlet to avoid unnecessary trips to the database.

In a disclosed embodiment, the web application requires Java 2 Standard Edition (J2SE). Any servlet container, including Apache Jserv, Jakarta-Tomcat, Allaire's JRun, or BEA WebLogic may be used. A web server is required.

User Interface

The system in a disclosed embodiment of this invention offers a simple, easy-to-use, web-based user interface. Any modern web browser application can be used to quickly create and edit listings.

All user interaction with the system is performed by filling out short forms or navigating through categories via hypertext links and selecting check boxes. New users to the system may create, navigate and edit listings with little or no training. The system includes a simple category and item search facility. The search facility can be used to retrieve known-labeled categories and items.

All listing items, including their category lineages, are shown when navigating the top-level (property-level) categories. While navigating other categories, only the listing items in the current category and its subcategories are shown. This gives the user a summary of the listing, regardless of the category level they are navigating.

Once a listing is created, the user has the option of adding data from a previous PDA application upload, or adding no data, and proceeding without data from a PDA. The listing is fully modifiable online. "Online" refers to anything related to the interactive digital environment, such as the Internet and the world wide web. Listings that already have item data cannot subsequently add PDA data. PDA data must be added to a listing as its first operation. The user will be reminded that a listing will be unable to be modified once this option has been foregone.

Use with the Handheld Application

In one embodiment of this invention, the web application can be used in conjunction with the ListAndSend™ handheld application to allow agents to enter data on-site into portable handheld computer devices. When a listing is entered onto a handheld unit, it may be sent to the web application for further editing, as well as posting to an MSL.

The data is sent and stored in XML format on the server until it is merged with a new listing online. The data merging process is one way. Listing data cannot be retrieved from the web application and edited on the PDA.

Listings must be created using the web application, regardless of the use of the PDA Application. Any uploaded from the PDA to the ListAndSend™ web application can be added to any new listing:

Other Embodiments

In a preferred embodiment, the present invention allows hierarchical data to be stored in a single table with a system of addressing replacing the key fields that relate data in the traditional model. By arranging the data in a single table, the database can be searched faster and use less space on the computer. As exemplified in FIG. 6, this single, vertical table is made possible by assigning each record (row) in the table a hierarchical address. In this way, any piece of data can be placed as its own record in a single column or field in the table and still be distinguished from every other record in the table by its address. Said address may sometimes be referred to herein as the address field, although it should be understood that the word "field" when used alone refers the position or column in a table. The addressing may take the form of a series of numbers (e.g., 3120 or 8.16.20.6), a series of letters (e.g., PIJH or C.F.A.M.), a combination of the two or may take the form of words. The only requirement is that the address must be formed of characters that can be logically ordered. It may also include a sequence of numbers or letters to identify a hierarchy or group of data and separate that group from others in the database. This grouping ID can exist as part of the address or as a separate field in each record that belongs to that group. The data can be entered into the table via any user interface and may be generated from a picklist for standardization or by entry from a keyboard or similar device.

The present invention provides a method of storing hierarchical data in a single database table using a system of addressing to relate the data. Each piece of data would be stored as a separate record in the table. The address would be stored in a field separate from the data and would comprise a sequence of characters that place that record in the hierarchy. The characters used in the address can be any that can have a logical order. As the user enters data that is broad and encompassing, a short address would be assigned to indicate its place at the top of the hierarchy. As more specific details are entered, an address would be assigned that includes and appends to the address of the records that those details describe. This would indicate the more specific and defined position in the hierarchy of that record. The table could be ordered and searched based on these addresses.

Figure 7:
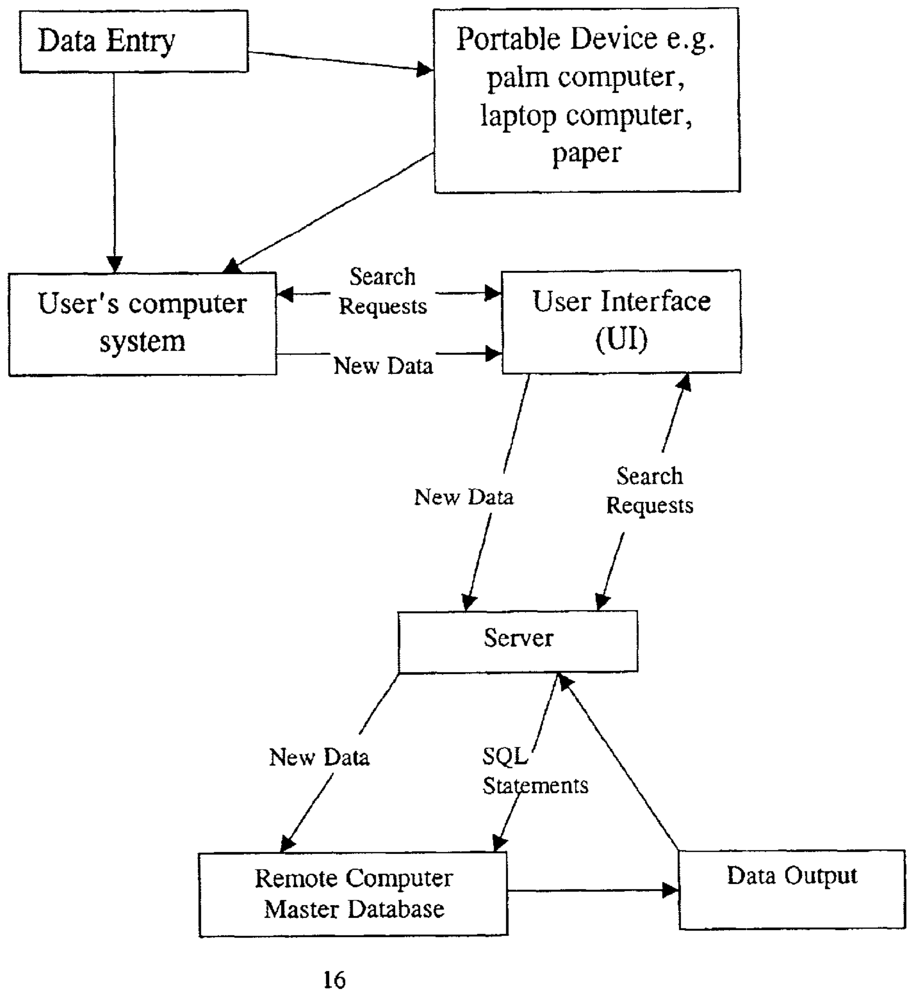
FIG. 7 is an illustration of a possible organization of the computer system of the present invention using a remote server.

In FIG. 7, using the realty industry as an illustration, the user could record feature information about a property on any PDA such as a handheld computer or personal data assistant, a laptop computer, a cellular or mobile phone, any paper material, or any computer device that accepts data entry. If paper is preferred, the data would be transferred into any of the above mentioned computer devices when the realtor is able. From these recording devices the user could then transfer the data as needed to the master database.

Figure 8:
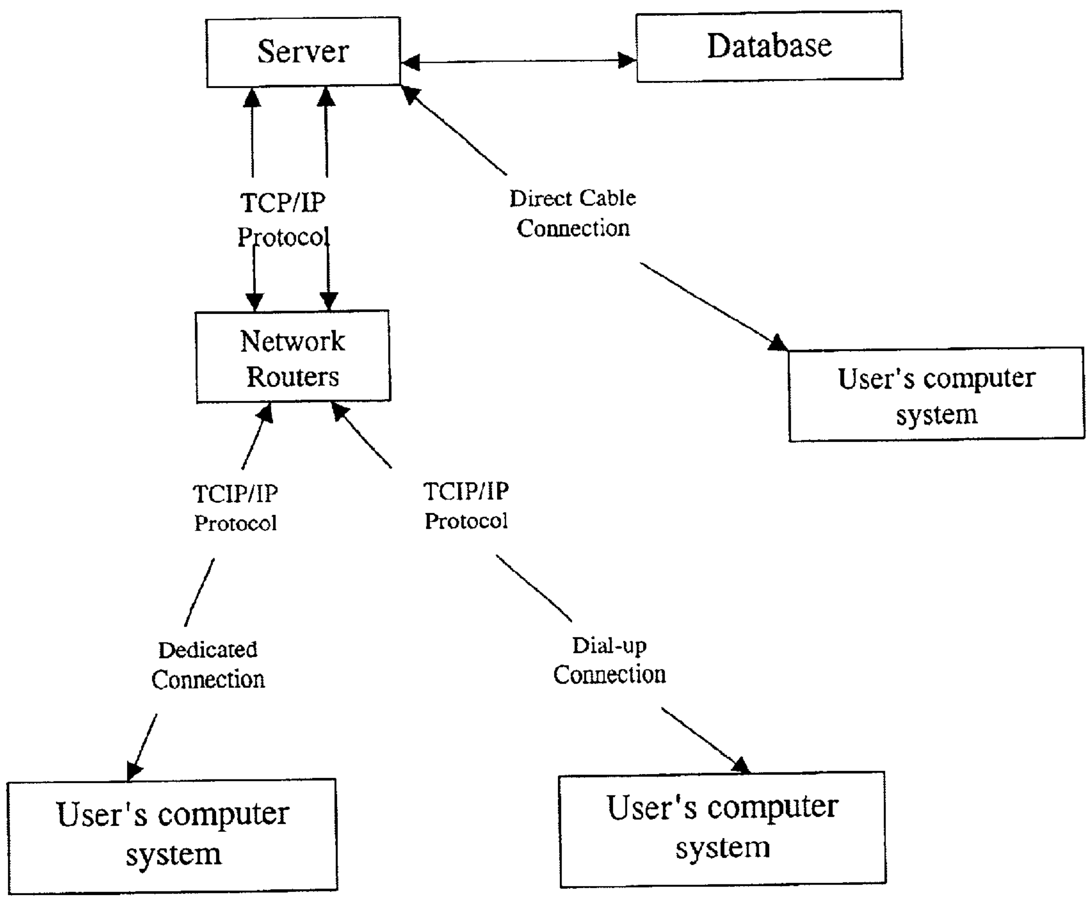
FIG. 8 is an illustration of some of the search methods possible with hierarchical addressing of the present invention, in this case using the real estate industry.

The master database may exist locally or, as illustrated in FIG. 7, it may exist on a remote computer. The remote computer may take the form of a network server, Internet server or a networked or non-networked workstation or personal computer. In cases that utilize a remote machine to store the database, data transfer from the computer device used for the initial recording of the data may be accomplished by various means. The interface itself may take the form of a customized software application that is stored locally or web based or any existing software application able to export the data in a compatible format. Web-based formats may be accessed through any browser for use by computer, cellular or mobile phone or personal data assistant. A browser refers to a client program that enables a viewer, or the person using the interactive digital medium, to interact with the worldwide web or the interconnected network of HTML documents on the Internet. "HTML document" refers to a worldwide web file that resides on the Internet and specifies what a browser should display to a viewer. The transfer of the data itself can take place via direct serial cable connection to the machine containing the master database or through connection to that machine through any modem, cable, DSL (digital subscriber line), ISDN (integrated services digital network) or satellite connection. Possible organizations of the application service provider system are depicted in FIG. 8.

The data entry may make use of a preformatted checklist or picklist or it may be simply a recording of items as the realtor finds them. The data would be recorded into the database by typing it into a user interface or by choosing the property attributes from a series of picklists. A user interface could be used to guide the agent through the data entry in a hierarchical manner.

It will be appreciated that what is described here represents only the presently preferred implementation of a user interface for use with the invention, and that other implementations are possible. The picklist may be thought of, in a more general sense, as a selection element. The selection element will be understood to be a display area responsive to user inputs to select one of a plurality of predetermined selectable values. The buttons allowing selection of a given item in the selection element may be understood to constitute a navigation element responsive to user inputs to manipulate the display of the selection element and to indicate a selection from the plurality of predetermined selectable values of the selection element. It is highly advantageous in the user interface to include a display area that shows the location of the item in the hierarchy and the semantic manner in which the user's present inputs will be added to the database. Data entered by the user is recorded in the database table and assigned an address in the data management system.

The data management system according to the invention may be understood to include, in each row of a table, at least an address field and a descriptor. In the example as shown in FIG. 6, on the last line, the address field is (3.2.1.2.1.1) and the descriptor is (Range-Gas).

Each address field includes one or more identifiers; that is, each of the values may be separated by periods or characters (i.e., each value separated by a period in 3.2.1.2.1.1) as an identifier. Each identifier may be thought of as having a position (i.e., the "3" is in a first position, the "2" adjacent it is in a second position, etc.). The positions of the identifiers are always ordered, and may optionally be separated by separators (such as periods). Separators are not essential, however. For example, the address field (321211) will suffice without separators when there are only a limited number of values which the identifiers may have.

If, for example, the first identifier (3) has thousands of possible values, then it will be necessary to use more than one position to represent this, and a separator might be useful in this instance. One such example would be (3.21211) where everything before the first period is the first identifier and each character after the period is a one-character identifier. The foregoing example would accommodate (9999.21211) or any other number of values for the first identifier.

In the same situation, however, the use of separators may be avoided by allocating more than one character to a position. Where the first identifier has thousands of possible values, it is possible to form the address field with a first identifier of four characters, and each other identifier of one character, such as (000321211).

An address field having only a few identifiers may be thought of as relating to something higher in the hierarchy than an address field having more identifiers.

It will be appreciated that an address field might include null identifiers. Thus, the address field might be (3.2.-.-.-.-) instead of simply (3.2). The use of null identifiers is an implementation decision, and may be based on implementation-specific parameters such as whether the address field must have a fixed length or the like. It will be understood that, in this discussion, an address field with two identifiers is logically the same as an address field with eight identifiers, six of which are null.

Figure 10:
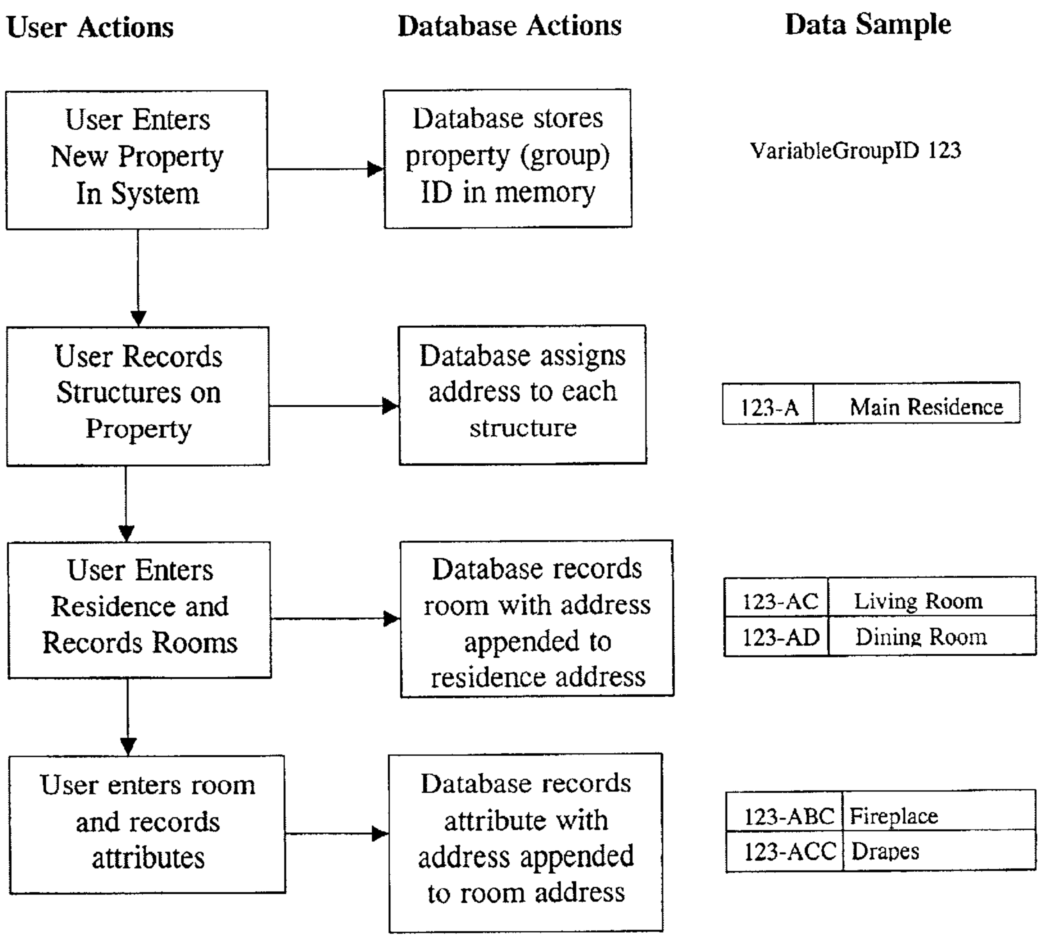
FIG. 10 is a table showing one embodiment of the hierarchical addressing and feature field using the real estate industry as an example.

Using the real estate industry as an example, a "Main Residence" may be entered in the database as a structure on a property. "Main Residence" would be recorded in the database table and assigned an address. The system would also record an identifier to show to which property the residence belonged. This ID may be attached to the address or stored in a separate field in that record. FIG. 10 illustrates one hierarchical address and feature field arrangement where the ID is separated into a separate field.

Various different approaches to actually implementing the address field will occur to those familiar with this field, and will meet the spirit of the invention so long as they include a hierarchically ordered set of identifiers.

For each of the data entries, the records are controlled to provide a table with a highest level record, which is most general or broadest record, and a plurality of semantically lower records, which relate to the next higher level record but are more specific or narrow in scope. The semantic meaning of a descriptor in a given record depends not on the value of the address field per se, but is based on the values of the descriptors in the set of records semantically "above" the given record. One record is semantically "above" another when all of the identifiers of the address field of the one record appear identically in the same position in the address field of the other record, but the other record has one or more identifiers not appearing in the address field of the one record. That is to say, the other record will have one or more identifiers that the one record does not have.

It will be understood that a given entity (such as a real property, inventory, hotels, hotel rooms and the like) can be described by the collection of records semantically "below" it. The collection of records below a given record is the subset of all records that have the given record as a semantically "above" record. The given entity will be understood to have one highest-level record and a plurality of records below it.

This method of storing data allows much more detail to be recorded and searched in the future without a loss of efficiency. By searching for addresses of a certain length, the user could find out how many records were at a certain level in the hierarchy; i.e., the number of rooms in a residence. FIG. 8 illustrates that by searching for a certain sequence of numbers or letters at a given point in any address, the user could find the frequency of an item in any group of data; i.e., the number of properties with a detached garage.

The standard formatting of a relational database, in which tables are separated and related through key fields, uses a much larger amount of space on the computer and requires much more time to manage the data. Searching for a single data item over multiple tables is much slower than searching for the same item in a single table. Systems such as the MLS, which realtors currently use to record property data, avoid this problem by limiting the amount of data they store and the searchability of the database. The MLS also does not offer the realtor the flexibility to record unusual or unique attributes of a property because the number of available fields per property is very limited. A realtor would have no place except in a text comments field in the MLS to record if a property had an RV storage building, for example. The single table used by the invention also allows easy exporting of data in many different formats. These formats can allow for integration of the database with government off-the-shelf systems, commercial off-the-shelf systems, or privately/individually produced systems.

This vertically arranged hierarchical database system is applicable to any situation in which data can be ordered hierarchically. Some possible applications include the automotive industry (data on attributes of a car), the travel industry (data on airline tickets, hotel bookings, etc.), any retail organization (inventory data) or any medical organization (patient records).

By arranging the data as multiple records in a single table as opposed to multiple tables, a database can both record and retrieve data exponentially faster than with a standard relational database management system. This single table is created by assigning each record in the table a hierarchical address upon entry. Records are created for each data item in the table and are distinguished from every other record in the table by the address. The address may comprise a series of numbers or letters, or a combination of the two so long as a hierarchy can be created. An ID can be used to group data. The address can also be used in searching for data within or across groups. The system allows details to be recorded without addressing through additional fields.

According to the provisions of the patent statutes, we have explained the principle, preferred constructed and mode of operation of our invention, and have illustrated and described what we know and consider to represent its best embodiments. However, it should be understood that within the scope of the appended claims, the invention may be practiced, otherwise that specifically illustrated and described.

We claim:

1. A computer-implemented method of managing listing information, relating to at least one property, for a real estate database, the method comprising:

at said property, entering property specific information into a portable computing device;

communicating said the property specific information from said portable computing device to a server computer system; and adding, on said computer system, said property specific information as new records in a table having a plurality of records, each of said plurality of records including an address field and a descriptor; and controlling the entry of said new records in said table so that said address fields for all of said plurality of records define a hierarchical structure among said plurality of records in said table;

wherein:

said address field comprises a hierarchically ordered set of identifiers;

said controlling of said entry of said new records includes, for each said property:

providing a highest level record defined within said table descriptive of a property attribute;

providing a second highest level record defined within said table containing a plurality of attributes depending from said property attribute of said highest level record, said attributes being descriptive of a structure; and for each given record of said plurality of records other than ones having said highest level, the semantic meaning of said descriptor is based on a set of records in said table semantically above said given record; and providing a third highest level record defined within said table containing a plurality of attributes depending from said structure attribute of said second highest level record, said attributes being descriptive of a room attribute providing a highest level record in said table;

a particular record is a member of said set of records hierarchically defined above said given record when all of said identifiers of said particular record appear identically in the same positions in said address field of said given record but said given record has at least one identifier not appearing identically in the same position in said address field of said particular record.

2. The computer-implemented method of managing listing information as set forth in claim 1, wherein also providing a fourth highest level record defined within said table containing at least one record having a field for entry of text descriptive information depending from said room attribute of said third highest level record.

3. The computer-implemented method of managing listing information as set forth in claim 1 or 2, wherein further comprising the step of providing a user interface on said personal computing device having a field for displaying the successive levels of priority in hierarchical order, with which the current level is hierarchically associated.

4. The computer-implemented method of managing listing information as set forth in claim 3, wherein said portable computing device is a handheld computer.

5. The computer-implemented method of managing listing information as set forth in claim 4, wherein said method further comprises providing an extensible markup language (XML) script, executable on said handheld computer, said XML script including a set of definitions being further defined and associated in a hierarchical addressing scheme.

6. The computer-implemented method of managing listing information as set forth in claim 5, wherein said table of hierarchically addressed fields being extensible without limitation to include additional said address fields, said address fields having an association with and depending logically from at least one of said logically higher levels of record.

7. The computer-implemented method of managing listing information as set forth in claim 6, wherein also providing means for capturing digital video images describing said next higher level record.

8. The computer-implemented method of managing listing information as set forth in claim 7, wherein said means for capturing digital video images comprises a digital camera coupled with a handheld computer having means for storing and addressing said video image.

9. The computer-implemented method of managing listing information as set forth in claim 8, wherein said digital camera being integrally mounted on said handheld personal digital computer.

10. The computer-implemented method of managing listing information as set forth in claim 9, wherein also providing means for electronically measuring and recording dimensions associated with an attribute of one of said records in a said second, third or fourth higher level record.

11. The computer-implemented method of managing listing information as set forth in claim 10, wherein said means for electronically measuring and recording dimensions comprises art infrared (IR) measuring device coupled with a handheld personal digital computer for storing and addressing said dimensions.

12. The computer-implemented method of managing listing information as set forth in claim 11, wherein said IR measuring device being integrally mounted on said handheld personal digital computer.

13. The computer-implemented method of managing listing information as set forth in claim 12, wherein said handheld personal digital computer operable by means of a computer application responsive to voice commands, said handheld computer having the ability to interpret voice signals for insertion of data related to said real estate.

14. The computer-implemented method of managing listing information as set forth in claim 13, wherein combining digital camera, IR and voice recognition in table for creation of virtual tour, comprising visual, audio and text descriptions within a said listing, said descriptions being displayable on a handheld computer.

15. A computer-implemented method of cross referencing a relational database with a hierarchical database comprising the steps of:

creating a definitional document, said document containing a data dictionary assigning numeric address information consistent with the subject matter of the database;

loading a definitional document into a standard database format;

accessing data from the definitional document for a programming language; and writing said data to a database table consistent with the definitions set forth in said definitional document;

wherein said definitional document comprises a set of real estate descriptive definitions ordered hierarchically to define a plurality of records in at least three levels of priority, wherein a highest level record sets forth property descriptive information, a second highest level record sets forth structure descriptive information and depends logically from at least one of said highest level records, and a third highest level record sets forth room descriptive information and depends logically from at least one of said second highest level records.

16. The computer-implemented method of cross referencing a relational database with a hierarchical database as set forth in claim 15, wherein also comprising records in N additional hierarchical levels of priority, wherein N representing a positive integer, each said Nth level of priority associated with and depending logically from at least one of said (N−1)th level records.

17. The computer-implemented method of cross referencing a relational database with a hierarchical database as set forth in claim 15, wherein at least one of said records includes features associated with a next higher level record.

18. The computer-implemented method of cross referencing a relational database with a hierarchical database as set forth in claim 15, wherein at least one of said records includes features associated with a next higher level record.

19. The computer-implemented method of cross referencing a relational database with a hierarchical database as set forth in claim 16, wherein at least one of said records includes features associated with a next higher level record.

20. A computer-implemented method for creating, storing and managing real estate listing data in a hierarchical database comprising the steps of:

providing at least one portable handheld computer device having a computer-readable interactive program installed thereon and executable with an operating system associated with said handheld computer device, said interactive program having a menu-driven format, with a plurality of main menu selections displayed, and a first said menu selection being to enter a new listing, a second said menu selection being to open an existing listing, and a third said menu selection being to delete a listing;

displaying a prompt to identify a new real estate related listing responsive to user's selection to enter a new listing and, displaying a plurality of first level categories descriptive of a property associated with said listing from which the user may select for entering into a listing data set;

displaying a plurality of second level categories descriptive of one or more structures disposed on said property, if one of said first level categories is selected, and if an item is selected from second level categories, displaying at least one of third level categories descriptive of one or more rooms within said structure or structures in the second level category;

displaying at least one subcategory descriptive of an item disposed within said one or more rooms to associate with the preceding level category up to a fifth level category;

optionally repeating the selection steps as desired to collect a set of selections that comprise a substantially complete set of descriptors of an associated property listing; and if the user selects open listing, the first level categories are displayed again, such that data associated with the listing already in the database can be supplemented or modified as the steps of a new listing are repeated;

if the user selects delete listing, displaying a complete picklist of listing records all the first level categories are displayed again, such that records may be selected for deletion;

at least one user operating said interactive program to create at least one set of said listing data associated with one or more properties, said at least one set of listing data including a hierarchically arranged plurality of descriptors for describing one or more real estate entities;

providing a communications link between said handheld computer device and an intermediate computer storage device for downloading the sets of data for storage on the intermediate computer storage device;

providing a computer network connecting said intermediate computer storage device to at least one central file server;

transferring said downloaded sets of listing data from said intermediate computer storage device to said at least one central file server;

incorporating a plurality of said sets of listing data into a cumulative, hierarchically organized file system; and accessing said file system via said computer network according to a predefined set of user security codes for retrieval of at least a portion of said listing data sets for use in compiling and disseminating listing data records in a plurality of formats adapted for marketing real estate entities.

21. The computer-implemented method as set forth in claim 20, wherein said computer network is the Internet and is accessed using a web browser having a user interface including navigation elements for selection of items for inclusion in a set of listing data.

22. The computer-implemented method as set forth in claim 21, wherein also providing a middleware program adapted to translate data from the central database to user programs written for access to a second database.

23. A computer software application for creating data records associated with one or more real estate listings comprising:

an interactive program having a menu-driven format, with a plurality of main menu selections displayed, a first said menu selection being to enter a new listing, a second said menu selection being to open an existing listing, and a third said menu selection being to delete a listing;

displaying a prompt to identify a new real estate related listing responsive to user's selection to enter a new listing and, displaying a plurality of first level categories descriptive of a property associated with said listing from which the user may select for entering into a record;

a plurality of second level categories descriptive of one or more structures disposed on said property, if one of said first level categories is selected, and if an item is selected from second level categories, at least one third level category descriptive of one or rooms within said structure or structures in one of the second level categories;

at least one subcategory descriptive of an item disposed within said one or more rooms to associate with the each higher level category up to a fifth level category;

each of said categories at every level being hierarchically defined in relation to the next higher level;

means for repeating the selection steps as desired to collect a set of selections that comprise a substantially complete set of descriptors of an associated property listing;

means for storing said one or more records locally;

means to edit any of said stored records;

means to delete one or more of said stored records;

said at least one record including a hierarchically arranged plurality of descriptors for describing one or more real estate entities; and a communications link for transmitting the records for storage in a central database.

24. The computer software application as set forth in claim 23, wherein said program is executable on a portable handheld computer device means is a HotSync® conduit storage means is a read only memory device capable of storing up to 32 MB of data.

25. The computer software application as set forth in claim 24, wherein said program being written in extensible markup language (XML).

26. The computer software application as set forth in claim 25, wherein said computer software application is an Internet-based application accessible by said users via the Internet, said users having at least one assigned security access code for verifying said user authorization.

27. A computer system for implementing a data management method of managing information relating to entities, comprising:

a processor; and a memory under control of said processor, with computer instructions for causing said processor to perform the steps of:

providing, on said computer system, a table for storing a plurality of records, each of said plurality of records having an address field and a descriptor; and controlling the entry of new records in said table so that said address fields for all of said plurality of records define a hierarchical structure among said plurality of records in said table;

wherein said address field comprises a hierarchically ordered set of identifiers; and said controlling of said new records includes, for each of said entities:

providing a highest level records in said table, and providing a plurality of records in said table hierarchically defined below said highest level record, each having said address field and said descriptor:

for each given record of said plurality of records, other than the records having said highest level, the meaning of said descriptor is based on a set of records in said table hierarchically defined above said given record; and a particular record is a member of said set of record hierarchically defined above said given record when all of said identifiers of said particular record appear identically in the same positions in said address field of said given record but said given record has at least one identifier not appearing identically in the same position in said address field of said particular record, wherein all of said plurality of records are stored in only a single table.

28. The computer system for implementing the data management method as set forth in claim 27, wherein one of said records record further includes feature information.

29. The computer system for implementing the data management method as set forth in claim 27, said steps further comprising a step of providing a user interface for use with said computer system, said user interface comprising:

a selection element responsive to user inputs to select one of a plurality of predetermined selectable values;

a navigation element responsive to user inputs to manipulate said selection element to display ones of said plurality of predetermined selectable values, and to indicate a selection of one of said predetermined selectable values; and a designation element responsive to user inputs to store in said table a new record having said descriptor based on said selection of said one of said predetermined selectable values.

30. The computer system for implementing the data management method as set forth in claim 29, wherein said user interface further comprises a hierarchical orientation element showing descriptor information for said set of records in said table semantically above said new record.

31. The computer system for implementing the data management method as set forth in claim 27, wherein all of said plurality of records are stored in the same table.

32. A computer program product for enabling a computer system to implement a data management method of managing information relating to entities, comprising:

a computer readable medium, and computer instructions, on said computer readable medium, adapted to cause a computer to perform the steps of:

providing, on said computer system, a table for storing a plurality of records, each of said plurality of records having an address field and a descriptor; and controlling the entry of new records in said table to that said address fields for all of said plurality of records define a hierarchial structure among said plurality of records in said table;

wherein:

said address field comprises a hierarchically ordered set of identifiers;

said controlling of said entry of said new records includes, for each of said entries:

providing a highest level record in said table, and providing a plurality of records in said table hierarchically defined below said highest level record, each having said address field and said descriptor:

for each given record of said plurality of records, other than the records having said highest level, the meaning of said descriptor is based on a set of records in said table hierarchically defined above said given record; and a particular record is a member of said set of record hierarchically defined above said given record when all of said identifiers of said particular record appear identically in the same positions in said address field of said given record but said given record has at least one identifier not appearing identically in the same position in said address field of said particular record, wherein all of said plurality of records are stored in only a single table.

33. The computer program product as set forth in claim 32, wherein one of said record records further includes feature information.

34. The computer program product as set forth in claim 32, said steps further comprising a step of providing a user interface for use with said computer system, said user interface comprising:

a selection element responsive to user inputs to select one of a plurality of predetermined selectable values;

a navigation element responsive to user inputs to manipulate said selection element to display ones of said plurality of predetermined selectable values, and to indicate a selection of one of said predetermined selectable values; and a designation element responsive to user inputs to store in said table a new record having said descriptor based on said selection of said one of said predetermined selectable values.

35. The computer program product as set forth in claim 34, wherein said user interface further comprises a hierarchical orientation element showing descriptor information for said set of records in said table semantically above said new record.

36. A computer-implemented method of obtaining listing information, relating to at least one property, for a real estate database, the method comprising:

at said property, entering property specific information into a portable computing device;

communicating said the property specific information from said portable computing device to a server computer system;

adding, on said computer system, said property specific information as new records in a table having a plurality of records, each of said plurality of records including an address field and a descriptor; and controlling the entry of said new records in said table so that said address fields for all of said plurality of records define a hierarchical structure among said plurality of records in said table;

wherein:

said address field comprises a hierarchically ordered set of identifiers;

said controlling of said entry of said new records includes, for each said property:

providing a highest level record in said table, and providing a plurality of records in said table hierarchically defined below said highest level record, each having said address field and said descriptor;

for each given record other than ones of said plurality of records having said highest level, the meaning of said descriptor is based on a set of records in said table hierarchically above said given record; and a particular record is a member of said set of records hierarchically above said given record when all of said identifiers of said particular record appear identically in the same positions in said address field of said given record but said given record has at least one identifier not appearing identically in the same position in said address field of said particular record.

* * * * *